US010940857B2

(12) United States Patent
Lee et al.

(10) Patent No.: US 10,940,857 B2
(45) Date of Patent: Mar. 9, 2021

(54) DRIVING CONTROL APPARATUS FOR A VEHICLE

(71) Applicant: LG Electronics Inc., Seoul (KR)

(72) Inventors: Jinkyo Lee, Seoul (KR); Taeho Noh, Seoul (KR)

(73) Assignee: LG Electronics Inc., Seoul (KR)

(*) Notice: Subject to any disclaimer, the term of this patent is extended or adjusted under 35 U.S.C. 154(b) by 433 days.

(21) Appl. No.: 15/835,915

(22) Filed: Dec. 8, 2017

(65) Prior Publication Data

US 2018/0162393 A1 Jun. 14, 2018

(30) Foreign Application Priority Data

Dec. 9, 2016 (KR) .................. 10-2016-0167366

(51) Int. Cl.
*B60W 30/09* (2012.01)
*B60W 30/095* (2012.01)
(Continued)

(52) U.S. Cl.
CPC ....... *B60W 30/095* (2013.01); *B60T 8/17558* (2013.01); *B60W 30/085* (2013.01); *B60W 30/09* (2013.01); *B60W 30/0953* (2013.01); *B60W 30/0956* (2013.01); *B60W 40/04* (2013.01); *B60T 2201/024* (2013.01); *B60T 2260/04* (2013.01); *B60T 2260/06* (2013.01);
(Continued)

(58) Field of Classification Search
USPC ....................................................... 701/301
See application file for complete search history.

(56) References Cited

U.S. PATENT DOCUMENTS 6,364,433 B1 4/2002 Steiner
8,050,863 B2 * 11/2011 Trepagnier ............ G01S 17/931
701/514
(Continued)

FOREIGN PATENT DOCUMENTS

CN 101434234 5/2009
DE 102011108870 4/2012
(Continued)

OTHER PUBLICATIONS

Machine translation of DE102013016724 (Year: 2014).*
(Continued)

*Primary Examiner* — James M McPherson
(74) *Attorney, Agent, or Firm* — Fish & Richardson P.C.

(57) ABSTRACT

A driving control apparatus for a vehicle is disclosed. The driving control apparatus includes: an object detection device configured to detect objects in the vicinity of the vehicle and generate information on the objects; a sensing unit configured to detect a state of the vehicle and generate vehicle state information; and a processor configured to: based on the vehicle state information and the information on the objects, generate information on collision with a first object out of the objects, and based on the information on the collision, generate a control signal for at least one of steering, partial braking, and partial driving of the vehicle and provide the generated control signal so as to control operation of the vehicle after the collision through at least one of a steering control action, a partial braking control action, and a partial driving control action.

19 Claims, 21 Drawing Sheets

(51) Int. Cl.
*B60W 40/04* (2006.01)
*B60W 30/085* (2012.01)
*B60T 8/1755* (2006.01)
*B60W 50/029* (2012.01)
*B60W 30/08* (2012.01)

(52) U.S. Cl.
CPC ............... *B60W 2030/082* (2013.01); *B60W 2050/0292* (2013.01); *B60W 2050/0295* (2013.01); *B60W 2050/0297* (2013.01); *B60W 2554/00* (2020.02); *B60W 2554/4041* (2020.02); *B60W 2554/80* (2020.02); *B60W 2554/801* (2020.02); *B60W 2554/803* (2020.02); *B60W 2554/804* (2020.02); *B60Y 2300/097* (2013.01); *B60Y 2300/0952* (2013.01); *B60Y 2300/0954* (2013.01)

(56) References Cited

U.S. PATENT DOCUMENTS

| | | | |
|---|---|---|---|
| 8,930,060 | B1 | 1/2015 | Lu et al. |
| 9,630,619 | B1* | 4/2017 | Kentley ................ G01C 21/32 |
| 2004/0061598 | A1* | 4/2004 | King .................... B60R 21/013 |
| | | | 340/435 |
| 2007/0080968 | A1* | 4/2007 | Kogure ................ B60W 30/09 |
| | | | 345/474 |
| 2017/0120902 | A1* | 5/2017 | Kentley ................ B60W 10/04 |
| 2017/0297568 | A1* | 10/2017 | Kentley ................ G09G 5/363 |

FOREIGN PATENT DOCUMENTS

| | | |
|---|---|---|
| DE | 102012107188 | 2/2014 |
| DE | 102013016724 | 6/2015 |
| DE | 102014008487 | 6/2015 |
| JP | 2002-274295 | 9/2002 |
| JP | 2002-316629 | 10/2002 |
| JP | 2003-081074 | 3/2003 |
| JP | 2010-179873 | 8/2010 |
| JP | 2012-188029 | 10/2012 |
| JP | 2014-189242 | 10/2014 |
| JP | 5639282 | 12/2014 |
| JP | 2015-101240 | 6/2015 |
| JP | 2015-151040 | 8/2015 |
| JP | 2016-102501 | 6/2016 |
| WO | 2015/097511 | 7/2015 |

OTHER PUBLICATIONS

Machine translation of JP2016102501 (Year: 2016).*
Extended European Search Report in European Application No. 17001512.7, dated Jan. 8, 2018, 10 pages.
Chinese Office Action in Chinese Application No. 201710155254.4, dated May 21, 2020, 23 pages (with English translation).

* cited by examiner

DRIVING CONTROL APPARATUS FOR A VEHICLE

CROSS-REFERENCE TO RELATED APPLICATION

This application claims the benefit of an earlier filing date and right of priority to Korean Patent Application No. 10-2016-0167366, filed on Dec. 9, 2016 in the Korean Intellectual Property Office, the content of which is incorporated by reference herein in its entirety.

TECHNICAL FIELD

The present application generally relates to a driving control apparatus for a vehicle.

BACKGROUND

A vehicle is an apparatus that moves in a direction desired by a user riding therein. A representative example of a vehicle is an automobile.

A vehicle typically uses a variety of sensors and electronic devices for the convenience of a user who uses the vehicle. In particular, for user driving convenience, an Advanced Driver Assistance System (ADAS) has been actively studied. In addition, enormous efforts have been being made to develop autonomous vehicles. A driving control apparatus for vehicle is provided in the ADAS or autonomous vehicles.

SUMMARY

In general, one innovative aspect of the subject matter described in this specification can be implemented in a driving control apparatus including: an object detection device configured to detect a plurality of object in the vicinity of the vehicle and generate information on the plurality of objects; a sensing unit configured to detect a state of the vehicle and generate vehicle state information; and a processor configured to: based on the vehicle state information and the information on the plurality of objects, generate information on collision with a first object out of the plurality of objects, and based on the information on the collision, generate a control signal for at least one of steering, partial braking, and partial driving of the vehicle and provide the generated control signal so as to control operation of the vehicle after the collision through at least one of a steering control action, a partial braking control action, and a partial driving control action.

The foregoing and other implementations can each optionally include one or more of the following features, alone or in combination. In particular, one implementation includes all the following features in combination. The object detection device is configured to generate information on the first object, and wherein the processor is configured to: based on the vehicle state information and the information on the first object, determine an impulse in the collision between the vehicle and the first object; and based on information about the impulse, generate the control signal. The object detection device is configured to generate information on the first object, and wherein the processor is configured to: based on the vehicle state information and the information on the first object, determine a direction in which the vehicle is to travel after the collision with the first object; and generate the control signal based on information on the determined direction. The processor is configured to: based on the vehicle state information and information on the first object, determine whether at least one of a steering apparatus, a power transmission apparatus, and a brake apparatus is controllable after the collision between the vehicle and the first object; and provide the control signal to the determined controllable device among the steering apparatus, the power transmission apparatus, and the brake apparatus, and wherein the power transmission apparatus transfers power, provided from a power source, to a plurality of wheels. The first object comprises a first nearby vehicle which is in front of the vehicle, and wherein the processor is configured to: when it is determined that the vehicle collides with the first nearby vehicle, generate the information on the collision; and generate a control signal for at least one of steering, partial braking, and partial driving of the vehicle, and provide the generated control signal so as to control the vehicle to stay off an expected travel path of a second nearby vehicle, which is travelling behind the vehicle, after the collision with the first nearby vehicle. The first object comprises a nearby vehicle which is approaching the vehicle from behind, and wherein the processor is configured to generate the information on the collision when it is determined that the vehicle collides with the nearby vehicle. The processor is configured to: based on information on the plurality of objects, determine a situation in front of the vehicle; and further based on the determined situation, generate the control signal. The processor is configured to: based on information on the plurality of objects, determine whether a sufficient space exists within a preset range in front of the vehicle; and when it is determined that the sufficient space exists in front of the vehicle, provide the control signal to control the vehicle to travel in a released state after collision with the nearby vehicle. The processor is configured to: upon collision between the vehicle and the nearby vehicle, determine a distance by which the vehicle is to travel in a released state, based on a driving speed of the vehicle and an impulse in the collision between the vehicle and the nearby vehicle; and provide the control signal to control the vehicle to be braked after travelling the determined distance in the released state. The processor is configured to: based on the information on the plurality of objects, determine whether a second object exists located outside the sufficient space; and when it is determined that the second object exists outside the sufficient space, provide the control signal so as to control the vehicle to be braked, without colliding with the second object, after travelling in the released state. When it is determined that a sufficient space is secured in front of the vehicle in the case where a brake input is received through a driving manipulation device after the collision between the vehicle and the nearby vehicle, the processor is configured to control an operation following the brake input not to be performed. The processor is configured to: based on the information on the plurality of objects, determine whether an object of volume equal to or smaller than a preset volume exists in front of the vehicle; and when it is determined that a second object of volume equal to or smaller than the preset volume exists in front of the vehicle, provide the control signal so as to control the vehicle to travel in the released state after the collision with the nearby vehicle and collide with the second object. The processor is configured to: based on the information on the plurality of objects, determine a lane in which the vehicle is travelling; and provide the control signal so as to control the vehicle to travel in the determined lane after the collision with the nearby vehicle. The processor is configured to: based on the information on the plurality of objects, determine a lane and the existence of a curve located in front of the vehicle; and provide the control signal to control the vehicle to travel in the determined lane in the curve after the collision with the nearby vehicle. The processor is configured to: based on the information on the plurality of objects, determine whether a second object exists located in a preset range in front of the vehicle; and when it is determined that the second object exists in the preset range, generate a control signal for at least one of steering, partial braking, and partial driving of the vehicle and provide the generated control signal so as to control the vehicle to avoid colliding with the second object after the collision with the nearby vehicle. The first object comprises a nearby vehicle that is approaching the vehicle from one side, and wherein, when it is determined that the vehicle collides with the nearby vehicle, the processor is configured to generate information on the collision. The information on the collision comprises information about an impulse in the collision between the vehicle and the nearby vehicle and information on a part of the vehicle which is affected by the collision, and wherein the processor is configured to, based on the information about the impulse and the information on the part affected by the collision, provide the control signal to individually drive or brake a plurality of wheels provided in the vehicle. The processor is configured to, based on the information on the part affected by the collision, provide the control signal so as to apply a greater driving force to a wheel located on the opposite side where the collision occurs than a wheel located on the side where the collision occurs, or to apply a smaller driving force to the wheel located on the side where the collision occurs than the wheel located on the opposite side where the collision occurs. The processor is configured to determine, based on the information about the impulse, an amount of a driving force to be applied to each of the plurality of wheels provided in the vehicle.

In general, another innovative aspect of the subject matter described in this specification can be implemented in a vehicle comprising a driving control apparatus that includes: an object detection device configured to detect a plurality of object in the vicinity of the vehicle and generate information on the plurality of objects; a sensing unit configured to detect a state of the vehicle and generate vehicle state information; and a processor configured to: based on the vehicle state information and the information on the plurality of objects, generate information on collision with a first object out of the plurality of objects, and based on the information on the collision, generate a control signal for at least one of steering, partial braking, and partial driving of the vehicle and provide the generated control signal so as to control operation of the vehicle after the collision through at least one of a steering control action, a partial braking control action, and a partial driving control action.

The details of one or more examples of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Although technologies for preventing a traffic accident have been developed and studied, technologies for controlling a vehicle after an accident still remain at an embryonic stage.

It is often difficult to control a vehicle after an accident, which can result in a second accident due to difficulties in reducing impulses applied to the vehicle.

A driving control apparatus can control a vehicle even if the vehicle collides with an object. Thus, when the vehicle collides with an object, the driving control apparatus can control the vehicle to reduce impulse from the collision. In addition, the driving control apparatus can control the vehicle to prevent subsequent vehicle accidents that are caused by the collision.

A vehicle may include an automobile and a motorcycle. In addition, a vehicle may include an internal combustion engine vehicle including an engine as a power source, a hybrid vehicle including both an engine and an electric motor as a power source, and an electric vehicle including an electric motor as a power source.

Figure 1:
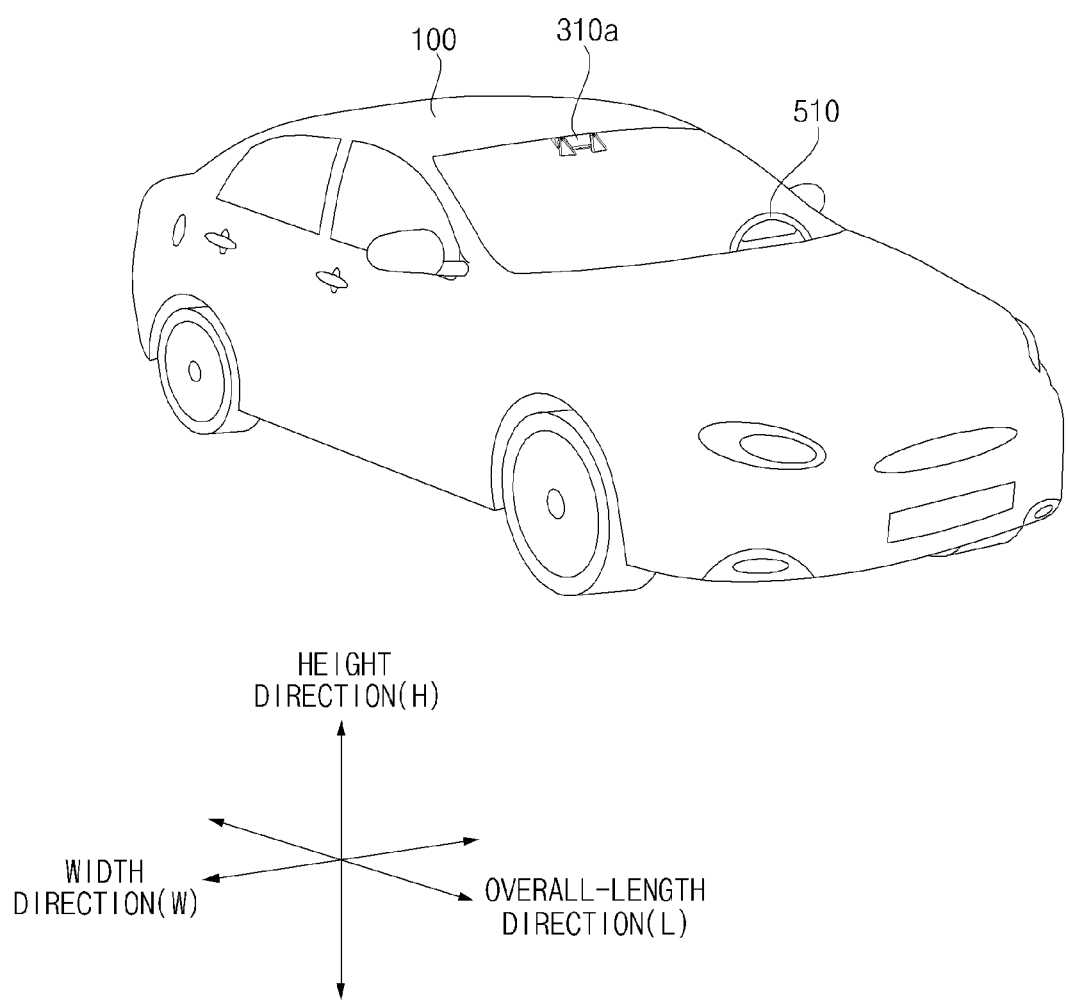
FIG. 1 is a diagram illustrating an example of a vehicle.
Figure 2:
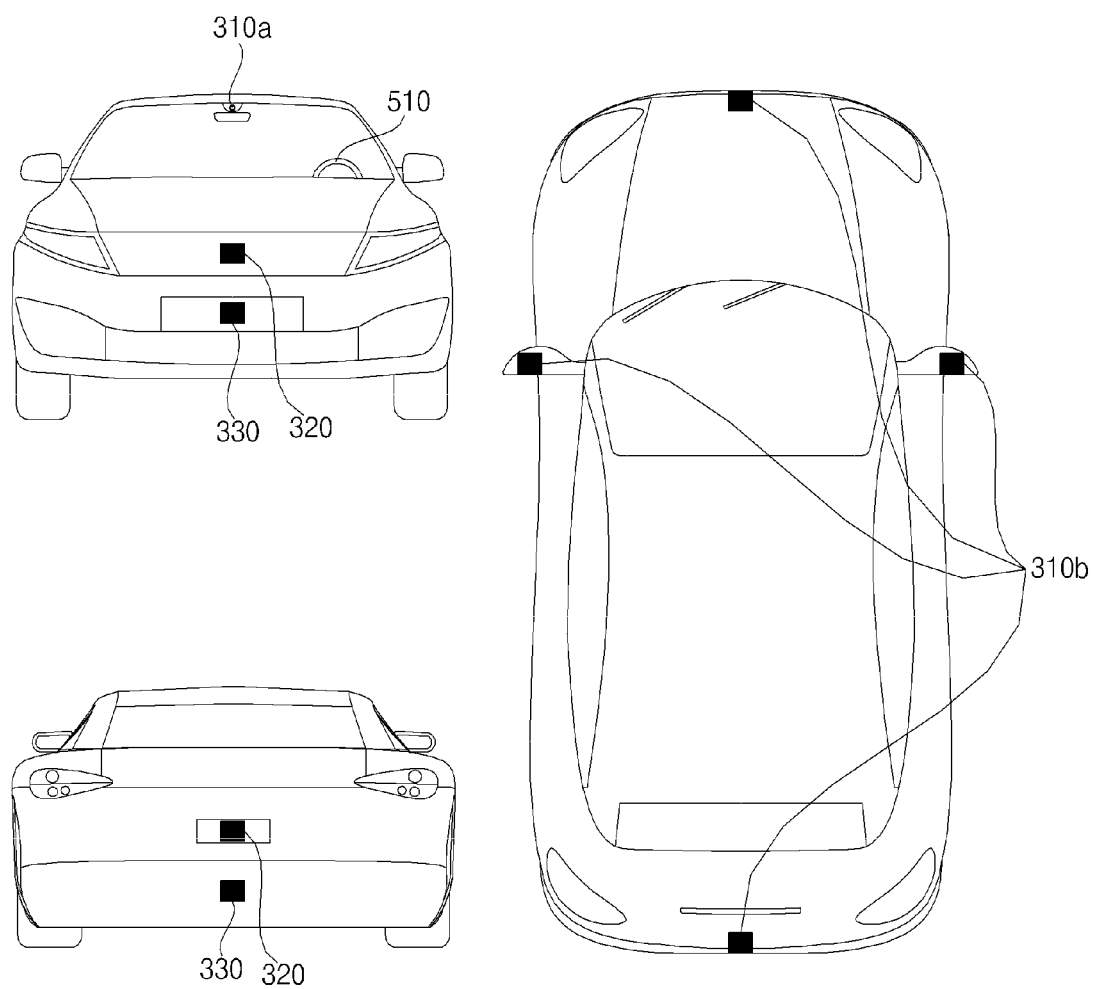
FIG. 2 is a diagram illustrating an example of an exterior of a vehicle.
Figure 3:
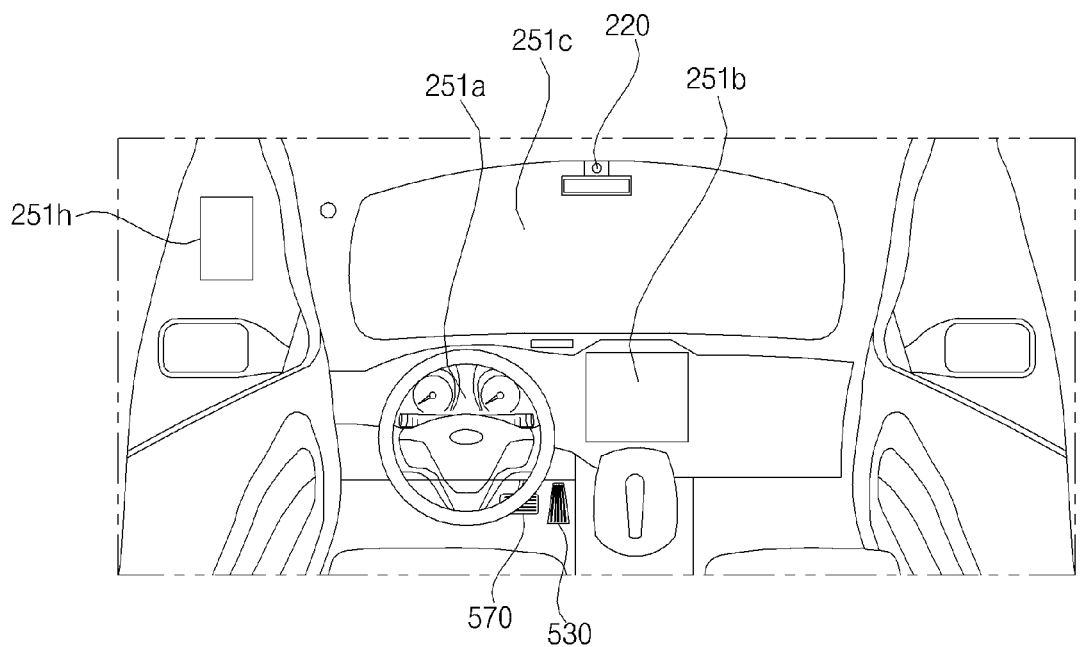
FIGS. 3 and 4 are diagrams illustrating examples of an interior of a vehicle.
Figure 4:
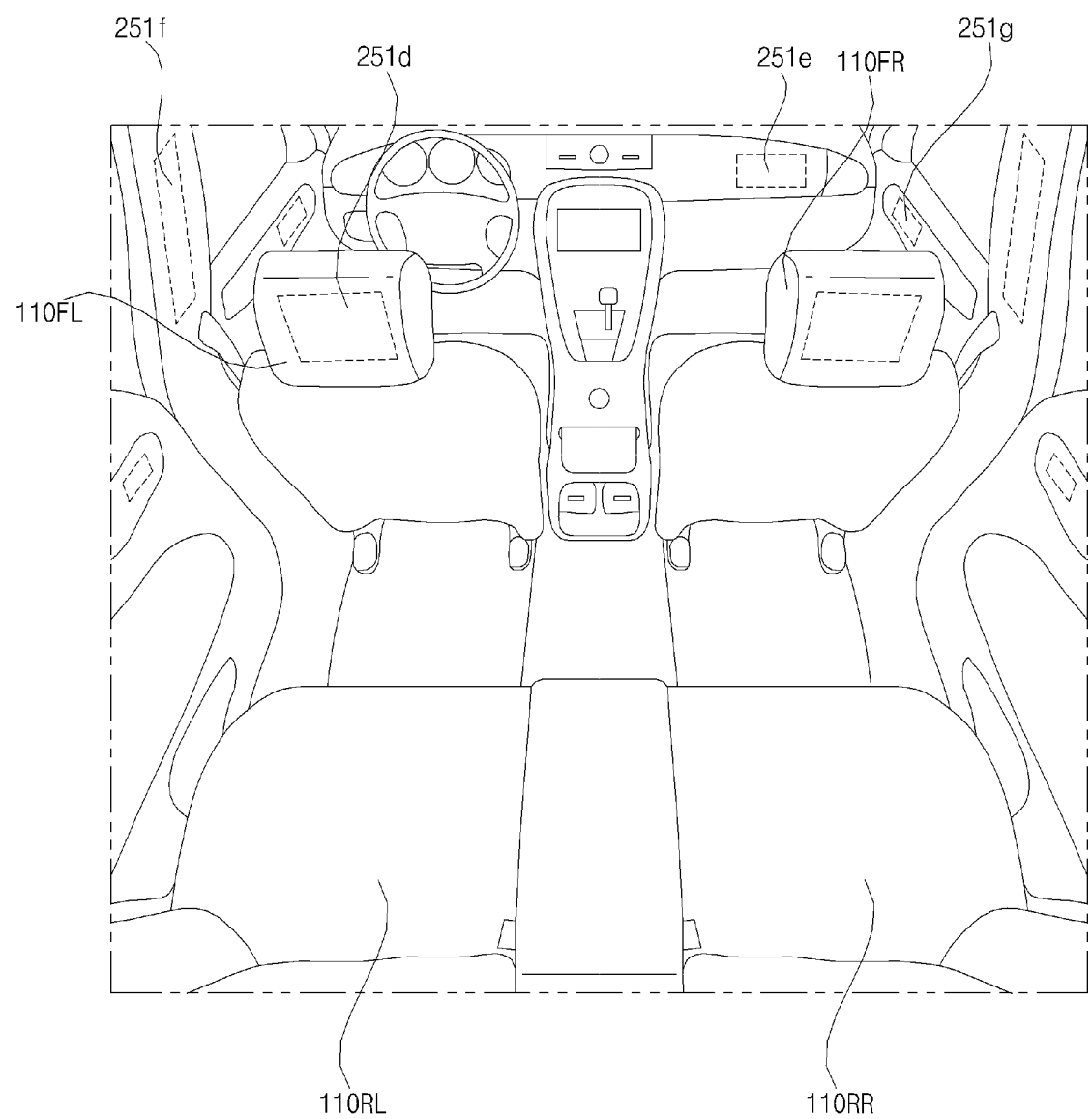
Figure 5:
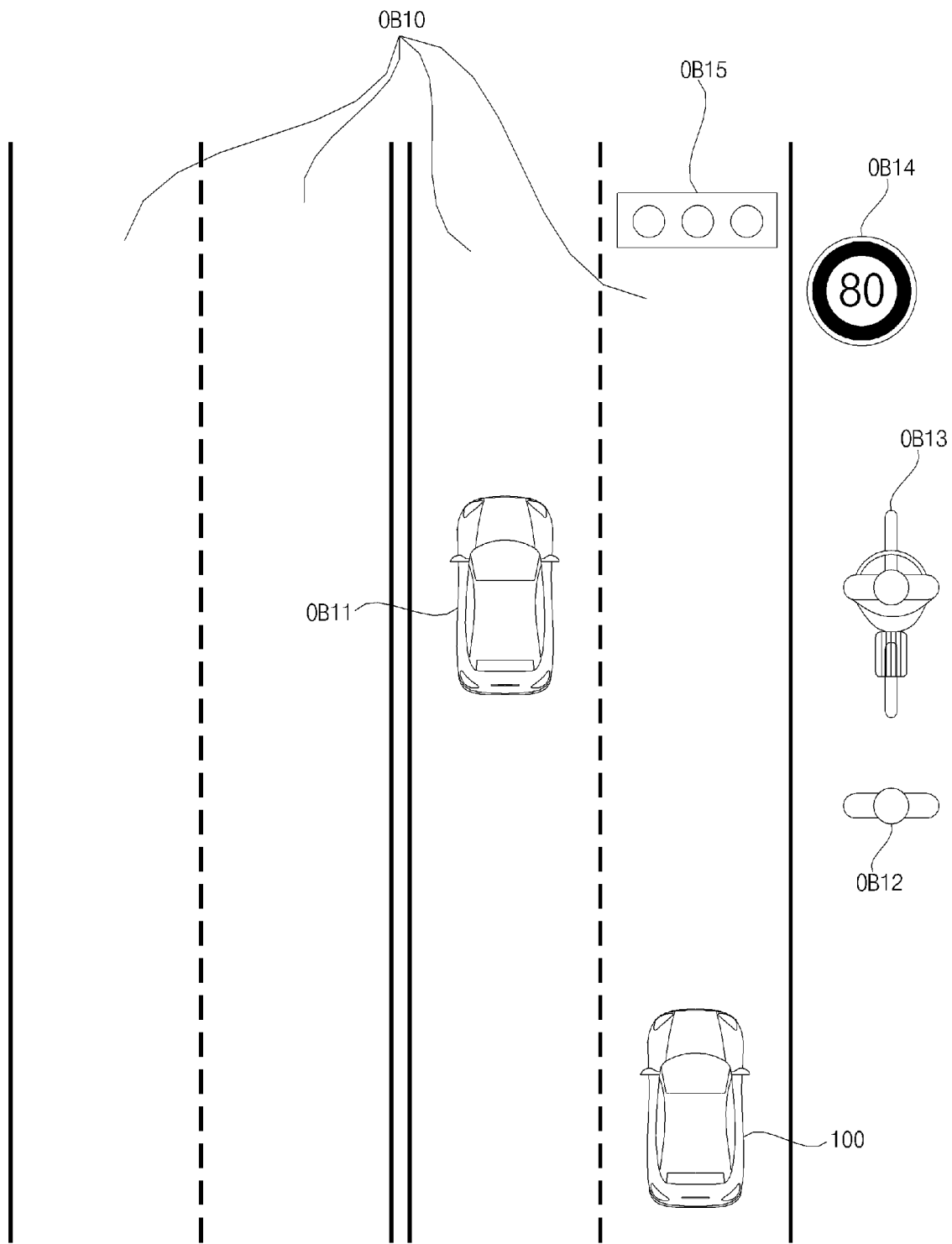
FIGS. 5 and 6 are diagrams illustrating examples of one or more objects outside a vehicle.
Figure 6:
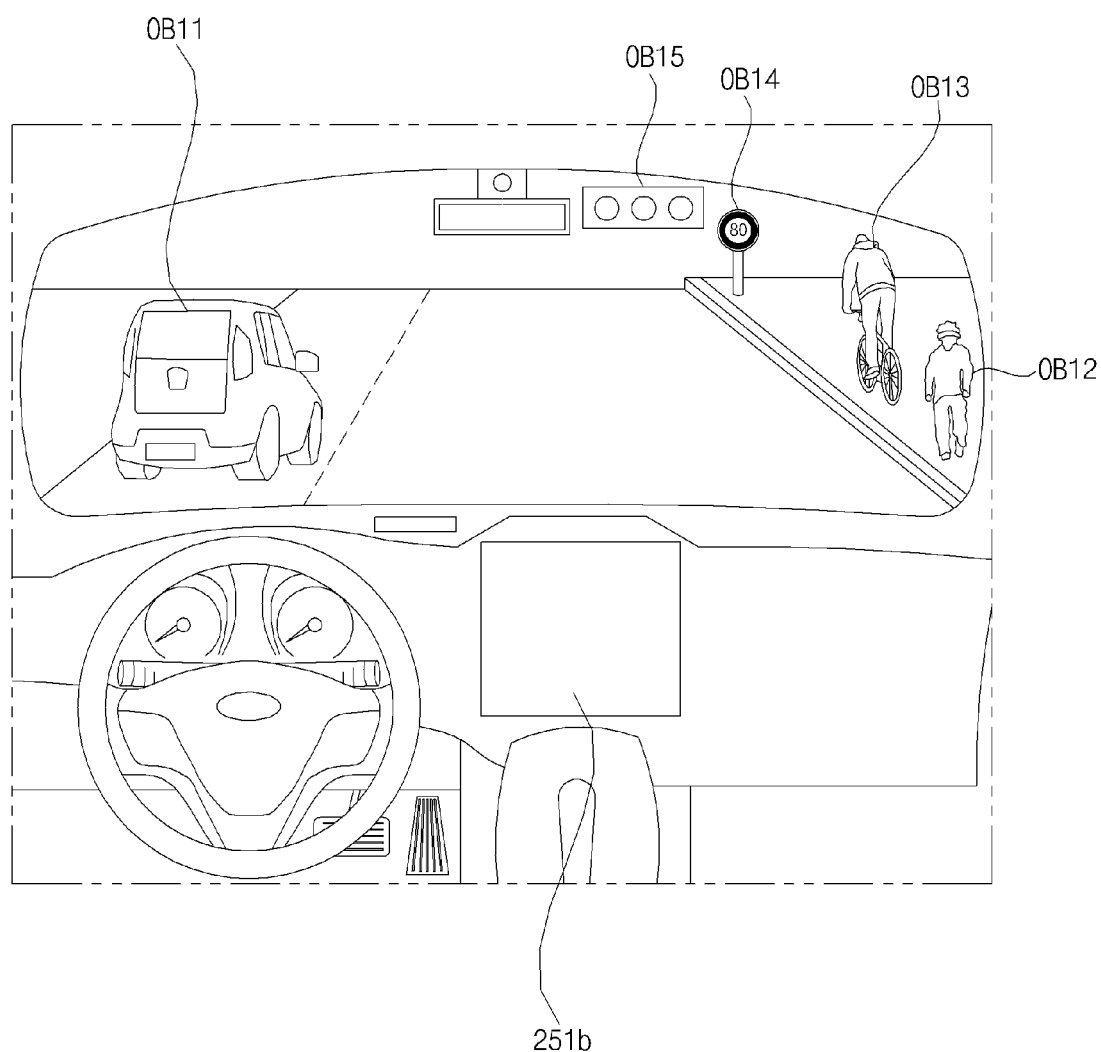
Figure 7:
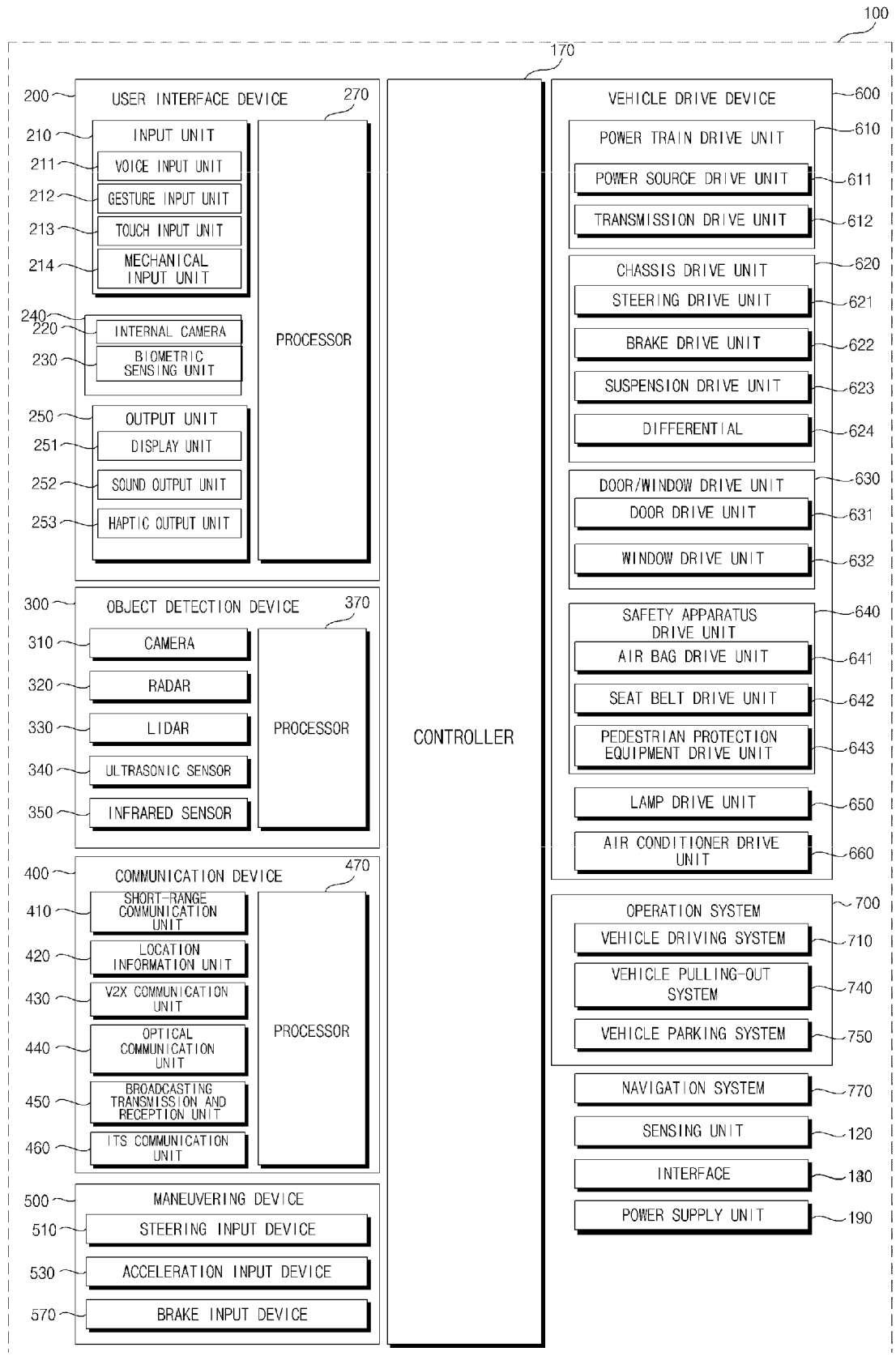
FIG. 7 is a diagram illustrating an example of a vehicle.

FIG. 1 illustrates an example vehicle. FIG. 2 illustrates an example exterior of a vehicle. FIGS. 3 and 4 illustrate an example interior of a vehicle. FIGS. 5 and 6 illustrate one or more example objects outside a vehicle. FIG. 7 illustrates an example vehicle.

In FIGS. 1 to 7, a vehicle 100 may include a plurality of wheels, which are rotated by a power source, and a steering input device 510 for adjusting a direction of travel of the vehicle 100.

The vehicle 100 may be an autonomous vehicle.
The vehicle 100 may be switched to an autonomous driving mode or a manual mode in response to a user input.

For example, in response to a user input received through a user interface device 200, the vehicle 100 may be switched from a manual mode to an autonomous driving mode, or vice versa.

The vehicle 100 may be switched to an autonomous mode or a manual mode based on driving situation information.

The driving situation information may include at least one of the following: information on an object outside a vehicle, navigation information, and vehicle condition information.

For example, the vehicle 100 may be switched from the manual mode to the autonomous driving mode, or vice versa, based on driving situation information generated in the object detection device 300.

As another example, the vehicle 100 may be switched from the manual mode to the autonomous driving mode, or vice versa, based on driving situation information received through a communication device 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated in a driving system 710, a parking-out system 740, and a parking system 750.

While operating in the manual mode, the autonomous vehicle 100 may receive a user input for driving of the vehicle 100 through a driving operation device 500. In response to the user input received through the driving operation device 500, the vehicle 100 may operate.

For example, the term "overall length" can represent the length from the front end to the rear end of the vehicle 100, the term "overall width" can represent the width of the vehicle 100, and the term "overall height" can represent the height from the bottom of the wheel to the roof. In the following description, the term "overall length direction L" can represent the reference direction for the measurement of the overall length of the vehicle 100, the term "overall width direction W" can represent the reference direction for the measurement of the overall width of the vehicle 100, and the term "overall height direction H" can represent the reference direction for the measurement of the overall height of the vehicle 100.

As illustrated in FIG. 7, the vehicle 100 may include the user interface device 200, the object detection device 300, the communication device 400, the driving operation device 500, a vehicle drive device 600, an operation system 700, a navigation system 770, a sensing unit 120, an interface unit 130, a memory 140, at least one processor such as controller 170, and a power supply unit 190.

In some implementations, the vehicle 100 may further include other components in addition to the aforementioned components, or may not include some of the aforementioned components.

The user interface device 200 is configured to communicate between the vehicle 100 and a user. The user interface device 200 may receive a user input, and provide information generated in the vehicle 100 to the user. The vehicle 100 may implement User Interfaces (UI) or User Experience (UX) through the user interface device 200.

The user interface device 200 may include an input unit 210, an internal camera 220, a bio-sensing unit 230, an output unit 250, and at least one processor such as processor 270.

In some implementations, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be located inside the vehicle 100. For example, the input unit 210 may be disposed in one region of a steering wheel, one region of an instrument panel, one region of a seat, one region of each pillar, one region of a door, one region of a center console, one region of a head lining, one region of a sun visor, one region of a windshield, or one region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of optical output units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be integrally formed with a display unit 251 as one body to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle. The processor 270 may sense a user's condition based on the images of the inside of the vehicle. The processor 270 may acquire information on eye gaze information of the user. The processor 270 may sense a gesture of the user from the images of the inside of the vehicle.

The bio-sensing unit 230 may acquire biological information of the user. The bio-sensing unit 230 may include a sensor for acquire biological information of the user, and may utilize the sensor to acquire finger print information, heart rate information, etc. of the user. The biological information may be used for user authentication.

The output unit 250 is configured to generate a visual, acoustic, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in one region of a steering wheel, one region 251a, 251b, or 251e of an instrument panel, one region 251d of a seat, one region 251f of each pillar, one region 251g of a door, one region of a center console, one region of a head lining, one region of a sun visor, one region 251c of a windshield, or one region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output thereof.

The processor 270 may control the overall operation of each unit of the user interface device 200.

In some implementations, the user interface device 200 may include a plurality of processors 270 or may not include the processor 270.

In the case where the user interface device 200 does not include the processor 270, the user interface device 200 may operate under the control of the controller 170 or a processor of a different device inside the vehicle 100.

In some implementations, the user interface device 200 may be referred to as a display device for vehicles.

The user interface device 200 may operate under the control of the controller 170.

The object detection device 300 is configured to detect an object located outside the vehicle 100. The object detection device 300 may generate object information based on sensing data.

The object information may include information as to whether any object exists, location information of an object, information on a distance between the vehicle 100 and the object, and information on speed of the vehicle relative to the object.

The object may include various objects related to travelling of the vehicle 100.

Referring to FIGS. 5 and 6, an object o may include a lane OB10, a vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, and a lane in which a different vehicle is travelling in the opposite direction. The lane OB10 may include left and right lines that define the lane.

The vehicle OB11 may be a vehicle that is travelling in the vicinity of the vehicle 100. The vehicle OB11 may be a vehicle within a predetermined distance from the vehicle 100. For example, the vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic lamp OB15, a traffic sign OB14, and a pattern or text painted on a road surface.

The light may be light generated by a lamp provided in the vehicle. The light may be light generated by a street light. The light may be solar light.

The road may include a road surface, a curve, and slopes, such as an uphill slope and a downhill slope.

The structure may be a body located around the road in the state of being fixed onto the ground. For example, the structure may include a streetlight, a roadside tree, a building, a traffic lamp, and a bridge.

The geographical feature may include a mountain and a hill.

In some implementations, the object may be classified as a movable object or a stationary object. For example, the movable object may include a vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370.

In some implementations, the object detection device 300 may further include other components in addition to the aforementioned components, or may not include some of the aforementioned components.

The camera 310 may be located at an appropriate position outside the vehicle in order to acquire images of the outside of the vehicle. The camera 310 may be a mono camera, a stereo camera 310a, an Around View Monitoring (AVM) camera 310b, or a 360-degree camera.

The camera 310 may utilize various image processing algorithms to acquire location information of the object, information on the distance to the object, and information on the speed relative to the object.

For example, the camera 310 may acquire the information on the distance to the object and the information on the speed relative to the object, based on a change in size of the object over time in acquired images.

For example, the camera 310 may acquire the information on the distance to the object and the information on the speed relative to the object through a pin hole model or through profiling a road surface.

As another example, the camera 310 may acquire the information on the distance to the object and the information on the speed relative to the object, based on information on disparity between stereo images acquired by the stereo camera 310a.

For example, the camera 310 may be disposed near a front windshield in the vehicle in order to acquire images of the front of the vehicle. Alternatively, the camera 310 may be disposed around a front bumper or a radiator grill.

As another example, the camera 310 may be disposed near a rear glass in the vehicle in order to acquire images of the rear of the vehicle. Alternatively, the camera 310 may be disposed around a rear bumper, a trunk, or a tailgate.

In yet another example, the camera 310 may be disposed near at least one of the side windows in the vehicle in order to acquire images of the side of the vehicle. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing sensing data with pre-stored data, the sensing data which is sensed by the camera 310, the radar 320, the lidar 330, the ultrasonic sensor 340, and the infrared sensor 350.

The processor 370 may detect an object and track the detected object based on acquired images. The processor 370 may, for example, calculate the distance to the object and the speed relative to the object.

For example, based on change in size over time of an object in acquired images, the processor 370 may acquire information on distance to the object and information on speed relative to the object.

For example, the processor 370 may acquire information on distance to an object and information on speed relative to the object, by utilizing a pin hole model or by profiling a road surface.

For example, based on information on disparity of stereo images acquired by a stereo camera 310a, the camera 310 may acquire the information on distance to an object and information on speed relative to the object.

The processor 370 may detect an object and track the detected object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect an object and track the detected object based on a reflection laser light which is formed as a result of reflection of transmission laser by the object. Based on the laser light, the processor 370 may, for example, calculate the distance to the object and the speed relative to the object.

The processor 370 may detect an object and track the detected object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect an object and track the detected object based on reflection infrared light which is formed as a result of reflection of transmission infrared light by the object. Based on the infrared light, the processor 370 may, for example, calculate the distance to the object and the speed relative to the object.

In some implementations, the object detection device 300 may include a plurality of processors 370 or may not include the processor 370. For example, each of the camera 310, the radar 320, the lidar 330, the ultrasonic sensor 340, and the infrared sensor 350 may include its own processor.

In the case where the object detection device 300 does not include the processor 370, the object detection device 300 may operate under the control of the controller 170 or a processor inside the vehicle 100.

The object detection device 300 may operate under the control of the controller 170.

The communication device 400 is configured to perform communication with an external device. Here, the external device may be a vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some implementations, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and another vehicle located outside of the vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. As another example, the ITS communication unit 460 may receive a control signal from the traffic system, and provide the control signal to the controller 170 or a processor provided in the vehicle 100.

The processor 470 may control the overall operation of each unit of the communication device 400.

In some implementations, the communication device 400 may include a plurality of processors 470, or may not include the processor 470.

In the case where the communication device 400 does not include the processor 470, the communication device 400 may operate under the control of the controller 170 or a processor of a device inside of the vehicle 100.

In some implementations, the communication device 400 may implement a vehicle display device, together with the user interface device 200. In this case, the vehicle display device may be referred to as a telematics device or an Audio Video Navigation (AVN) device.

The communication device 400 may operate under the control of the controller 170.

The driving manipulation device 500 is configured to receive a user input for driving the vehicle 100.

In the manual mode, the vehicle 100 may operate based on a signal provided by the driving operation device 500.

The driving manipulation device 500 may include a steering input device 510, an acceleration input device 530, and a brake input device 570.

The steering input device 510 may receive a user input with regard to the driving direction of the vehicle 100. The steering input device 510 may take the form of a wheel to enable a steering input through the rotation thereof. In some implementations, the steering input device may be configured as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation device 500 may operate under the control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety equipment drive unit 640, a lamp drive unit 650, and an air conditioner drive unit 660.

In some implementations, the vehicle drive device 600 may further include other components in addition to the aforementioned components, or may not include some of the aforementioned components.

In some implementations, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under the control of the controller 170.

In the case where an electric motor is the power source, the power source drive unit 611 may control the motor. The power source drive unit 610 may control, for example, the RPM and toque of the motor under the control of the controller 170.

The transmission drive unit 612 may perform control of a transmission.

The transmission drive unit 612 may adjust the state of the transmission. The transmission drive unit 612 may change the transmission to a drive (D), reverse (R), neutral (N), or park (P) state.

In some implementations, in the case where an engine is the power source, the transmission drive unit 612 may adjust a gear-engaged state to the drive (D) state.

The chassis drive unit 620 may control the operation of a chassis.

The chassis drive unit 620 may include a steering drive unit 621, a brake drive unit 622, a suspension drive unit 623, and a differential 624.

The steering drive unit 621 may perform electronic control of a steering apparatus provided inside the vehicle 100. The steering drive unit 621 may change the driving direction of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may perform control such that a different degree-braking force is applied to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The differential 624 may control a different driving force to be applied to each wheel of the vehicle 100. For example, the differential 624 may include a first differential provided in the front axle shaft, and a second differential provided in the rear axle shaft. The first differential may control a different driving force to be applied to each of the two front wheels. The second differential may control a different driving force to be applied to each of the two rear wheels.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a seat belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The seat belt drive unit 642 may perform electronic control of a seatbelt apparatus inside the vehicle 100. For example, upon detection of a dangerous situation, the seat belt drive unit 642 may control passengers to be fixed onto seats 110FL, 110FR, 110RL, and 110RR with seat belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under the control of the controller 170.

The operation system 700 is a system for controlling the overall driving operation of the vehicle 100. The operation system 700 may operate in the autonomous driving mode.

The operation system 700 may include the driving system 710, the parking-out system 740, and the parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, in the case where the operation system 700 is implemented as software, the operation system 700 may be subordinate to the controller 170.

In some implementations, the operation system 700 may include at least one selected from among the user interface apparatus 200, the object detection device 300, the communication device 400, the driving manipulation device 500, the vehicle drive device 600, the navigation system 770, the sensing unit 120, and the controller 170.

The driving system 710 may perform driving of the vehicle 100.

The driving system 710 may receive navigation information from the navigation system 770 and provide a control signal to the vehicle drive device 600 to perform driving of the vehicle 100.

The driving system 710 may receive object information from the object detection device 300 and provides a control signal to the vehicle drive device 600 to perform driving of the vehicle 100.

The driving system 710 may receive a signal from an external device through the communication device 400 and provides a control signal to the vehicle drive device 600 to perform driving of the vehicle 100.

The driving system 710 may be a system which includes at least one selected from among the user interface apparatus 200, the object detection device 300, the communication device 400, the driving manipulation device 500, the vehicle drive device 600, the navigation system 770, the sensing unit 120, and the controller 170 so as to perform driving of the vehicle 100.

The driving system 710 may be referred to as a vehicle driving control apparatus.

The parking-out system 740 may perform a parking-out operation of the vehicle 100.

The parking-out system 740 may receive navigation information from the navigation system 770 and provide a control signal to the vehicle drive device 600 to perform a parking-out operation of the vehicle 100.

The parking-out system 740 may receive object information from the object detection device 300 and provides a control signal to the vehicle drive device 600 to perform a parking-out operation of the vehicle 100.

The parking-out system 740 may receive a signal from an external device through the communication device 400 and provide a control signal to the vehicle drive device 600 to perform a parking-out operation of the vehicle 100.

The parking-out system 740 may be a system which includes at least one selected from among the user interface device 200, the object detection device 300, the communication device 400, the driving manipulation device 500, the vehicle drive device 600, the navigation system 770, the sensing unit 120, and the controller 170 so as to perform a parking-out operation of the vehicle 100.

The parking-out system 740 may be referred to as a vehicle parking-out control apparatus.

The parking system 750 may perform a parking-in operation of the vehicle 100.

The parking system 750 may receive navigation information from the navigation system 770 and provide a control signal to the vehicle drive device 600 to perform a parking-in operation of the vehicle 100.

The parking system 750 may receive object information from the object detection device 300 and provide a control signal to the vehicle drive device 600 to perform a parking operation of the vehicle 100.

The parking system 750 may receive a signal from an external device through the communication device 400 and provide a control signal to the vehicle drive device 600 to perform a parking-in operation of the vehicle 100.

The vehicle parking 750 may be a system which includes at least one selected from among the user interface apparatus 200, the object detection device 300, the communication device 400, the driving manipulation device 500, the vehicle drive device 600, the navigation system 770, the sensing unit 120, and the controller 170 so as to perform a parking-in operation of the vehicle 100.

The parking system 750 may be referred to as a vehicle parking-in control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication device 400.

In some implementations, the navigation system 770 may be classified as a sub-component of the user interface device 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface unit 130 may serve as a passage for various kinds of external devices that are connected to the vehicle 100. For example, the interface unit 130 may have a port that is connectable to a mobile terminal and may be connected to the mobile terminal via the port. In this case, the interface unit 130 may exchange data with the mobile terminal.

In some implementations, the interface unit 130 may serve as a passage for the supply of electrical energy to a mobile terminal connected thereto. When the mobile terminal is electrically connected to the interface unit 130, the interface unit 130 may provide electrical energy, supplied from the power supply unit 190, to the mobile terminal under the control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be implemented as a sub-component of the controller 170.

The controller 170 may control the overall operation of each unit inside the vehicle 100. The controller 170 may be referred to as an Electronic Control Unit (ECU).

The power supply unit 190 may supply power required to operate each component under the control of the controller 170. In particular, the power supply unit 190 may receive power from, for example, a battery inside the vehicle.

Figure 8:
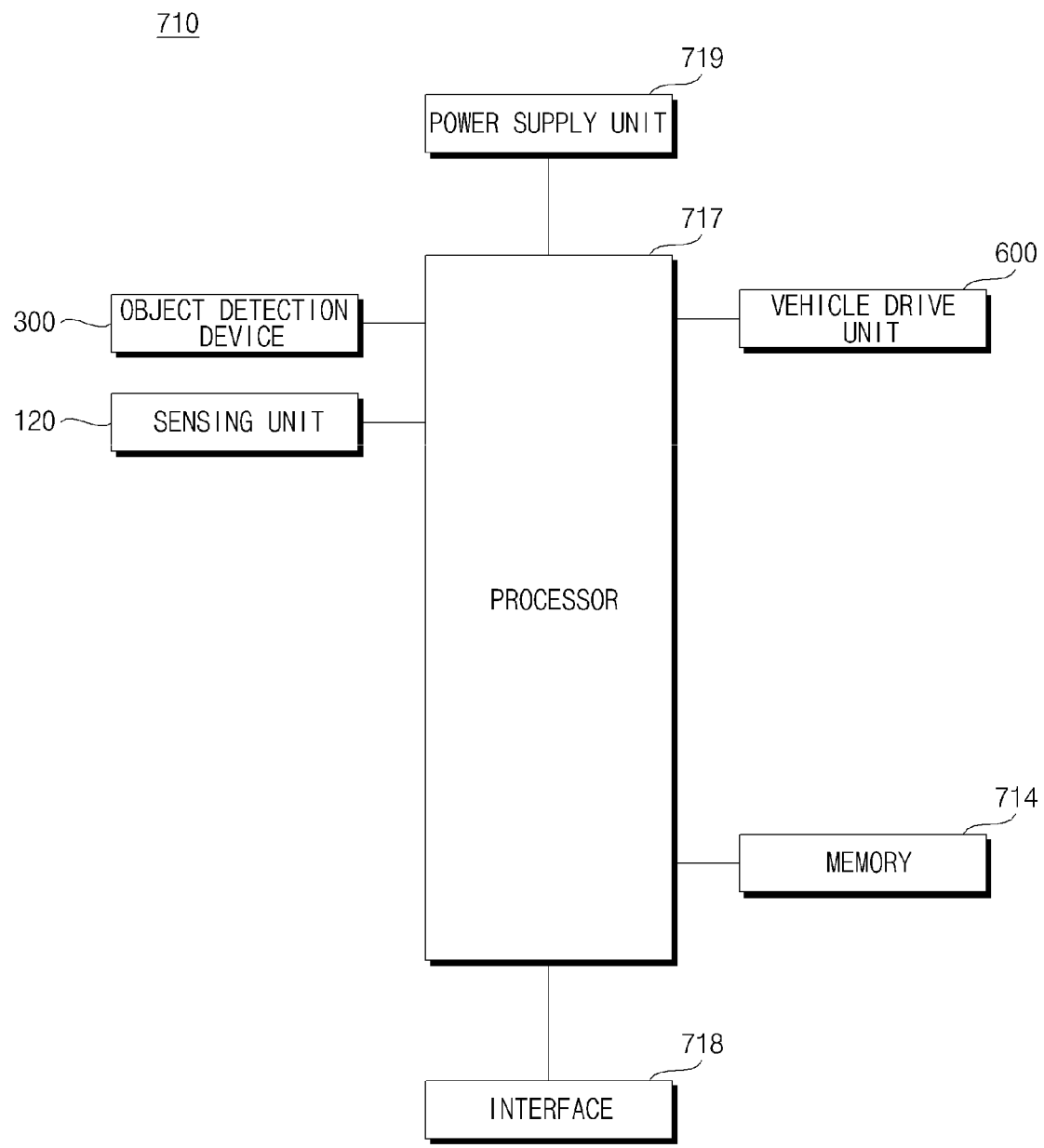
FIG. 8 is a diagram illustrating an example of a driving control apparatus.
Figure 9:
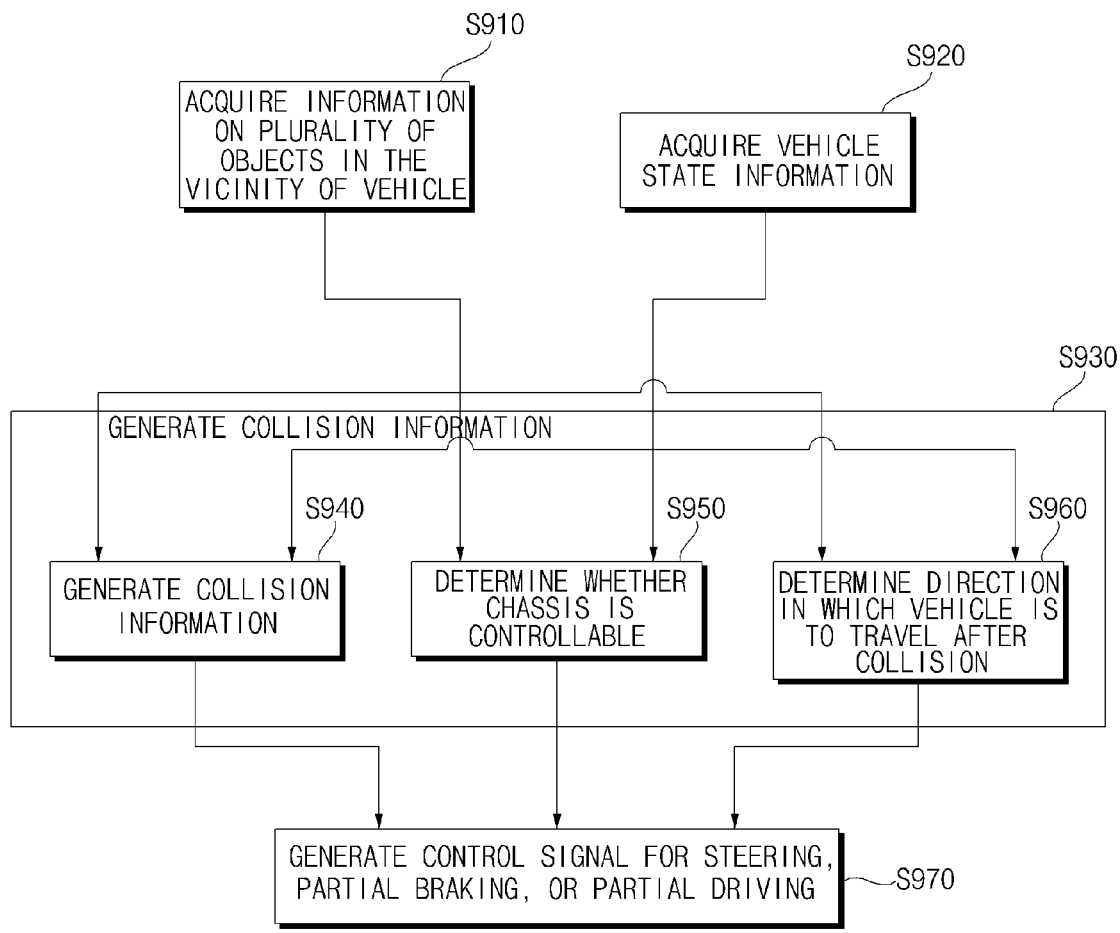
FIG. 9 is a flowchart illustrating an example of operating a driving control apparatus.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions FIG. 8 illustrates an example driving control apparatus.
FIG. 9 illustrates an example method for operating a driving control apparatus.

Referring to FIG. 8, a driving control apparatus 710 may include an object detection device 300, a sensing unit 120, a vehicle drive device 600, at least one processor such as processor 717, a memory 714, an interface unit 718, and a power supply unit 719.

The description about the object detection device 300, which is provided with reference to FIGS. 1 to 7, may be applied to the object detection device 300 shown in FIG. 8.

The object detection device 300 may detect a plurality of objects in the vicinity of the vehicle 100. The object detection device 300 may generate information on each of the plurality of objects.

For example, the object detection device 300 may generate information on a first object.

For example, the first object may include a vehicle located in front of the vehicle 100.

For example, the first object may include a vehicle approaching the vehicle 100 from behind.

For example, the first object may include a vehicle approaching the vehicle 100 from the left or from the right.

The description about the sensing unit 120, provided with reference to FIGS. 1 to 7, may be applied to the sensing unit 120 shown in 8.

The sensing unit 120 may sense a state of the vehicle 100. The sensing unit 120 may generate vehicle state information.

The description about the vehicle drive device 600, provided with reference to FIGS. 1 to 7, may be applied to the vehicle drive device 600 shown in FIG. 8.

The vehicle drive device 600 may drive various devices provided inside the vehicle 100 based on a control signal generated by the processor 717.

For example, the steering drive unit 621 of the vehicle drive device 600 may control a steering apparatus based on a control signal.

For example, the brake drive unit 622 of the vehicle driving unit 600 may control a brake apparatus based on a control signal. In some implementations, the brake drive unit 622 may individually control brake apparatuses provided in a plurality of wheels.

Applying different magnitude of a braking force to each of the plurality of wheels by control of the brake drive unit 622 may be referred to as a partial braking operation. The brake drive unit 622 may perform a partial braking operation.

For example, the power source drive unit 610 of the vehicle drive device 600 may control a power source based on a control signal.

For example, the differential 624 may distribute a driving force to the wheels based on a control signal.

The vehicle 100 may include a front wheel and a rear wheel. For example, the vehicle 100 may include two front wheels and two rear wheels.

In some implementations, front wheels 1801 and 1802 may be connected to a front axle shaft. The front axle shaft may be a drive axle which transfers power, or a movable axle which supports weight of a vehicle. The front axle shaft may include the differential 624. A first differential provided in the front axle shaft may control different magnitude of driving force to be applied to each of the two front wheels. Such a differential may be electrically connected to the processor 717 to operate under control of the processor 717.

Rear wheels 1803 and 1804 may be connected to a rear axle shaft. The rear axle shaft may be a drive axle which transfers power, or a movable axle which supports weight of a vehicle. The rear axle shaft may include the differential 624. A second differential provided in the rear axle shaft may control different driving forces to be applied to the two rear wheels. Such a differential may be electrically connected to the processor 717 to operate under control of the processor 717.

The processor 717 may control the differential 624 to provide a driving force to the plurality of wheels individually.

Applying different driving forces to the plurality of wheels through the control of the differential 624 may be referred to as a partial driving operation. The differential 624 may perform the partial driving operation.

The processor 717 may control the overall operation of each unit of the driving control apparatus 710.

Referring to FIG. 9, the processor 717 may acquire information on a plurality of objects in the vicinity of the vehicle 100 in S910.

The processor 717 may receive information on the plurality of objects from the object detection device 300.

For example, the information on the plurality of objects may include information on a vehicle in the vicinity of the vehicle 100.

The processor 717 may acquire vehicle state information in S920. Determining as to vehicle state information in S930 may include determining impulse in S940, determining whether a chassis is controllable in S950, and determining a direction in which the vehicle is to travel after collision in S960.

The processor 717 may receive vehicle state information from the sensing unit 120.

The processor 717 may generate collision information based on the vehicle state information and information on the plurality of objects in S930. The collision information may include: information as to whether a collision occurs; impulse information; information on a part of the vehicle which is affected by the collision; information as to whether a chassis is controllable after the collision; and information on a direction in which the vehicle is to travel after the collision.

Based on the vehicle state information and the information on the plurality of objects, the processor 717 may determine a collision with a first object out of the plurality of objects. The processor 717 may generate collision information based on the determination of the collision.

The processor 717 may determine impulse in the collision between the vehicle 100 and the first object in S940. Based on the vehicle state information and information on the first object, the processor 717 may determine the impulse in the collision between the vehicle 100 and the first object. Based on information on the impulse, the processor 717 may generate a control signal. The impulse may indicate a measure of impact that results from the detected collision.

The processor 717 may determine whether a chassis is controllable after the collision between the vehicle 100 and the first object in S950. After the collision between the vehicle 100 and the first object, the processor 717 may determine whether any one selected from among a steering apparatus, a power transmission apparatus, and a brake apparatus is controllable, based on the vehicle state information and the information on the first object. The power transmission apparatus may be an apparatus that transfers power, provided from a power source, to a plurality of wheels. The power transmission apparatus may include the aforementioned differential 624.

The processor 717 may include a control signal to a controllable device among the steering apparatus, the power transmission apparatus, and the brake apparatus.

The processor 717 may determine a direction of the vehicle 100 to move after the collision between the vehicle 100 and the first object in S960. Based on the vehicle state information and the information on the first object, the processor 717 may determine a direction of the vehicle 100 to move after the collision between the vehicle 100 and the first object. Based on information on the determined direction, the processor 717 may generate a control signal.

Based on collision information, the processor 717 may generate a control signal in S970.

In order to control operation of the vehicle 100 after the collision, the processor 717 may generate a control signal for at least one of steering, partial braking, and partial driving based on the collision information.

The processor 717 may provide a control signal to the vehicle drive device 600.

The processor 717 may generate a control signal for steering and provide the control signal to the steering drive unit 621.

The processor 717 may generate a control signal for braking and provide the control signal to the brake drive unit 622.

The processor 717 may generate a control signal for partial braking and provide the control signal to the brake drive unit 622.

The processor 717 may generate a control signal for driving and provide the control signal to the power source drive unit 611.

The processor 717 may generate a control signal for partial driving and provide the control signal to the differential 624.

The processor 717 may provide the generated control signal so as to control operation of the vehicle after the collision through at least one of a steering control action, a partial braking control action, and a partial driving control action.

The memory 714 is electrically connected to the processor 717. The memory 714 may store basic data for each unit, control data for the operational control of each unit, and input/output data. The memory 714 may be any of various hardware storage devices, such as a ROM, a RAM, an EPROM, a flash drive, and a hard drive. The memory 714 may store various data for the overall operation of the driving control apparatus 710, such as programs for the processing or control of the processor 717.

In some implementations, the memory 714 may be integrally formed with the processor 717, or may be provided as an element of the processor 717.

The interface unit 718 may exchange information, data, or signal with a different device included in the vehicle 100. The interface unit 718 may receive information, data, or a signal from a different device included in the vehicle 100. The interface unit 718 may transmit received information, received data, or a received signal to the processor 717. The processor 717 may information, data, or a signal, which is generated or processed in the processor 717, to a different device included in the vehicle 100.

Under control of the processor 717, the power supply unit 719 may supply power required for operation of each component. In particular, the power supply unit 719 may be supplied with power from a battery inside the vehicle 100.

Figure 10A:
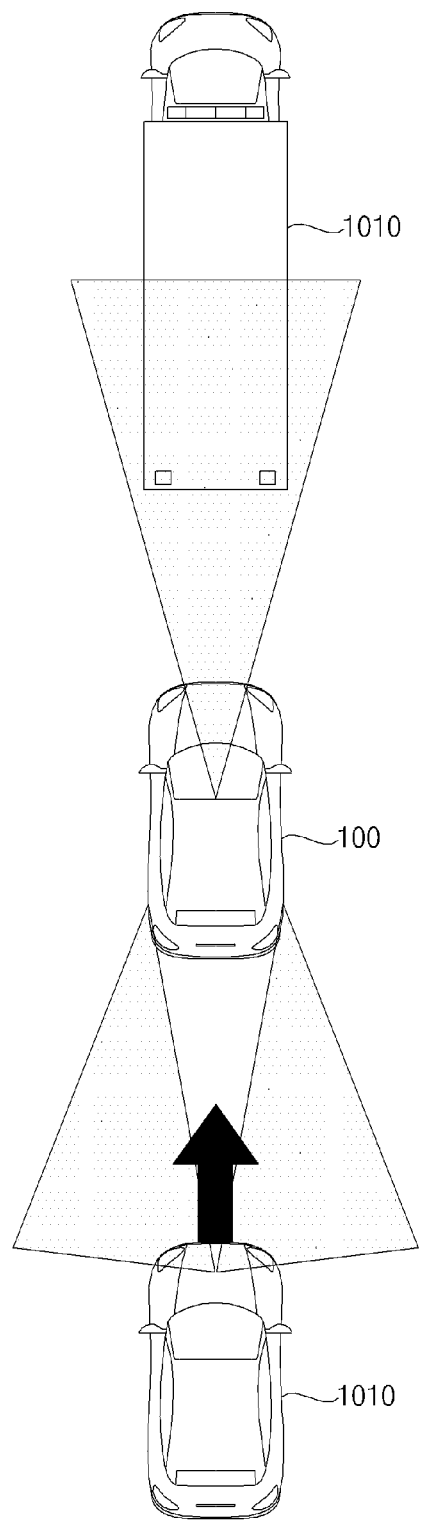
FIGS. 10A and 10B are diagrams illustrating examples of a driving control apparatus that determines an impulse from a collision between a vehicle and an object.
Figure 10B:
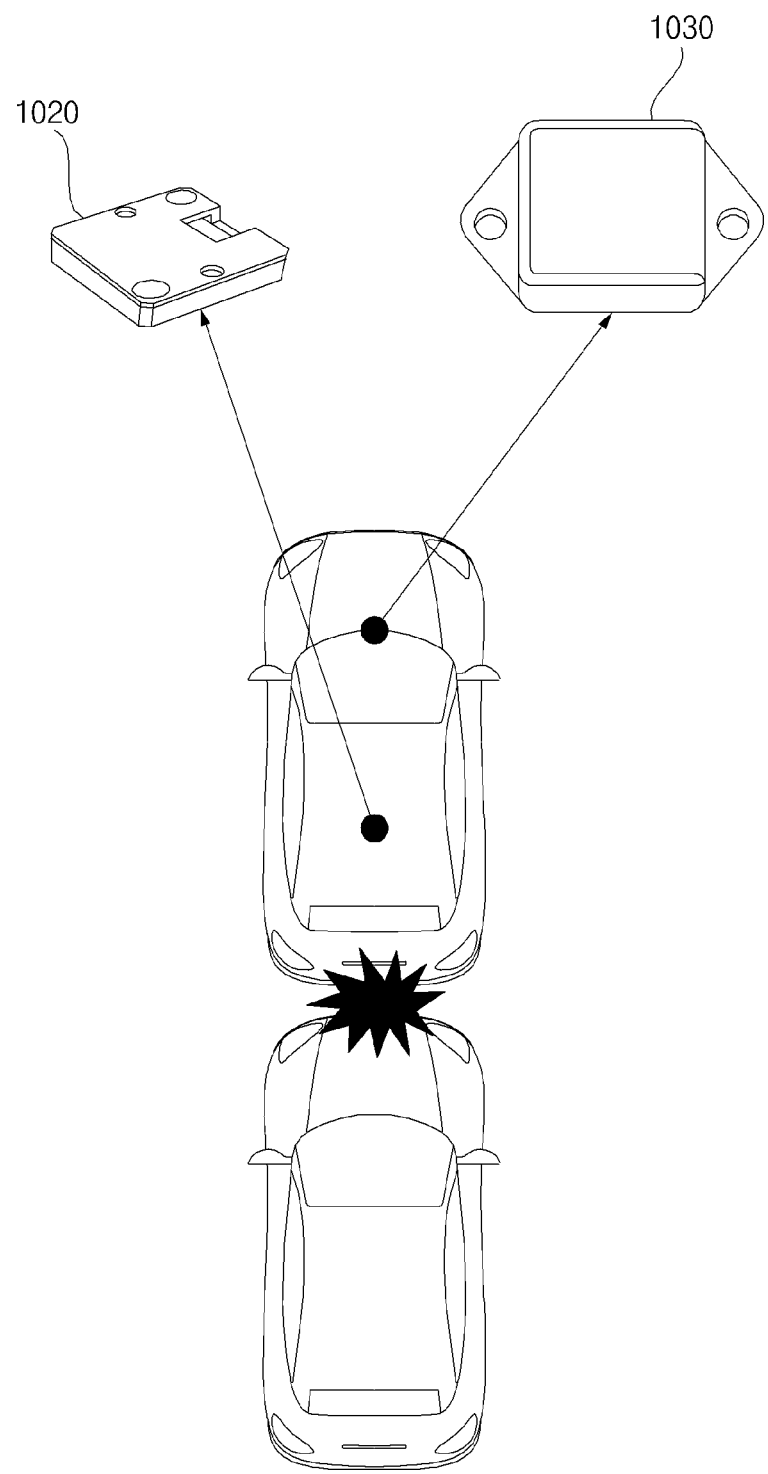

FIGS. 10A and 10B illustrate an example driving control apparatus that determines an impulse from a collision between a vehicle and an object.

The processor 717 may determine an impulse resulting from a collision between a first object 1010 and the vehicle 100. The impulse may be a measure of an impact of the detected collision.

Referring to FIG. 10A, the processor 717 may acquire information on the first object 1010 from the object detection device 300.

The information on the first object 1010 may include location information of the first object 1010, information on a distance between the vehicle 100 and the first object 1010, information on a speed of the vehicle 100 relative to the first object 1010, and weight information of the first object 1010. The processor 717 may acquire the weight information based on size information of the first object 1010.

The processor 717 may acquire information on the vehicle 100 from the sensing unit 120 or from the memory 714.

The information on the vehicle 100 may include speed information and weight information thereof.

The processor 717 may determine impulse in the collision between the vehicle 100 and the first object 1010 based on information about the first object 1010 and the vehicle 100.

The processor 717 may determine the impulse before or after the collision between the vehicle 100 and the first object 1010.

The processor 717 may determine a direction of impact based on the location information of the first object 1010.

Referring to FIG. 10B, vehicle state information may be generated based on a value sensed by an Inertial Measurement Unit (IMU) 1020 or an impact sensor 1030.

The sensing unit 120 may include the IMU 1020. The IMU 1020 may include a gyro sensor and an accelerometer sensor.

The processor 717 may determine impulse based on a value sensed by the IMU 1020 after collision between the vehicle 100 and the first object 1010.

The sensor 120 may include an impact sensor 1030.

The processor 717 may determine impulse based on a value sensed by the impact sensor 1030 after the collision between the vehicle 100 and the first object 1010.

The processor 717 may determine a direction of impact based on a value sensed by the IMU 1020 or the impact sensor 1030 after the collision between the vehicle 100 and the first object 1010.

Figure 11:
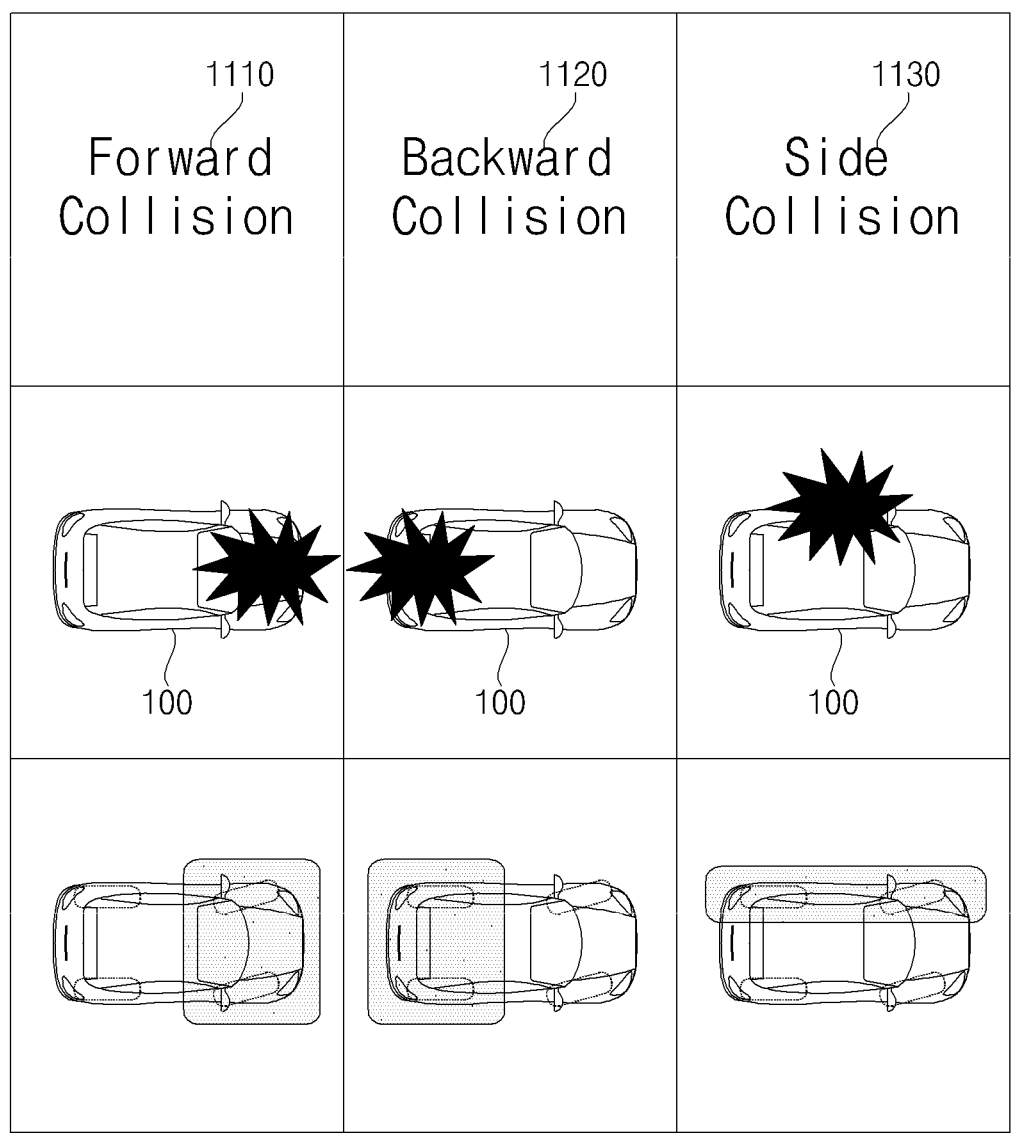
FIG. 11 is a diagram illustrating an example of a driving control apparatus that determines whether a chassis of a vehicle is controllable after a collision of the vehicle.

FIG. 11 illustrates an example driving control apparatus that determines whether a chassis of a vehicle is controllable after a collision of the vehicle.

Referring to FIG. 11, the processor 717 may determine whether a chassis is controllable after collision between the vehicle 100 and a first object.

For example, the processor 717 may determine whether a chassis is controllable, based on a signal that is received in response to a signal transmitted to the chassis.

For example, based on a direction of impact, the processor 717 may determine whether the chassis is controllable.

The processor 717 may determine a direction of impact. Based on the determined direction of impact, the processor 717 may determine the collision to be forward collision, backward collision, or side collision.

For example, when a forward collision occurs, the processor 717 may determine that it is not possible to control braking and driving of a steering apparatus and the front wheels.

For example, when a backward collision occurs, the processor 717 may determine that it is not possible to control braking and driving of the rear wheels.

For example, when a side collision occurs, the processor 717 may determine that it is not possible to control braking and driving of a wheel located on the side where the collision occurs.

The processor 717 may provide a control signal to a controllable device among a steering apparatus, a power transmission apparatus, and a brake apparatus.

For example, if a forward collision occurs and it is not possible to control braking and driving of the steering apparatus and the front wheels, the processor 717 may provide a signal to control braking and driving of the rear wheels. In this case, the processor 717 may adjust a driving direction of the vehicle 100 by partial braking or partial driving of the rear wheels.

For example, if a backward collision occurs and it is not possible to control braking and driving the rear wheels, the processor 717 may provide a signal to control braking and driving of the front wheels. In this case, the processor 717 may adjust a driving direction of the vehicle 100 through steering control. Alternatively, the processor 717 may adjust a driving direction of the vehicle 100 through partial braking or partial driving of the front wheels.

For example, in scenarios where a backward collision occurs, making it difficult to control braking and driving of a wheel located on the side where the collision occurs, the processor 717 may provide a signal to control braking or driving of a wheel located on the side where the collision has not occurred. In this case, the processor 717 may adjust a driving direction of the vehicle 100 through steering control. Alternatively, the processor 717 may adjust a driving direction of the vehicle 100 through partial braking or partial driving of the wheel located on the side where the collision has not occurred.

Figure 12:
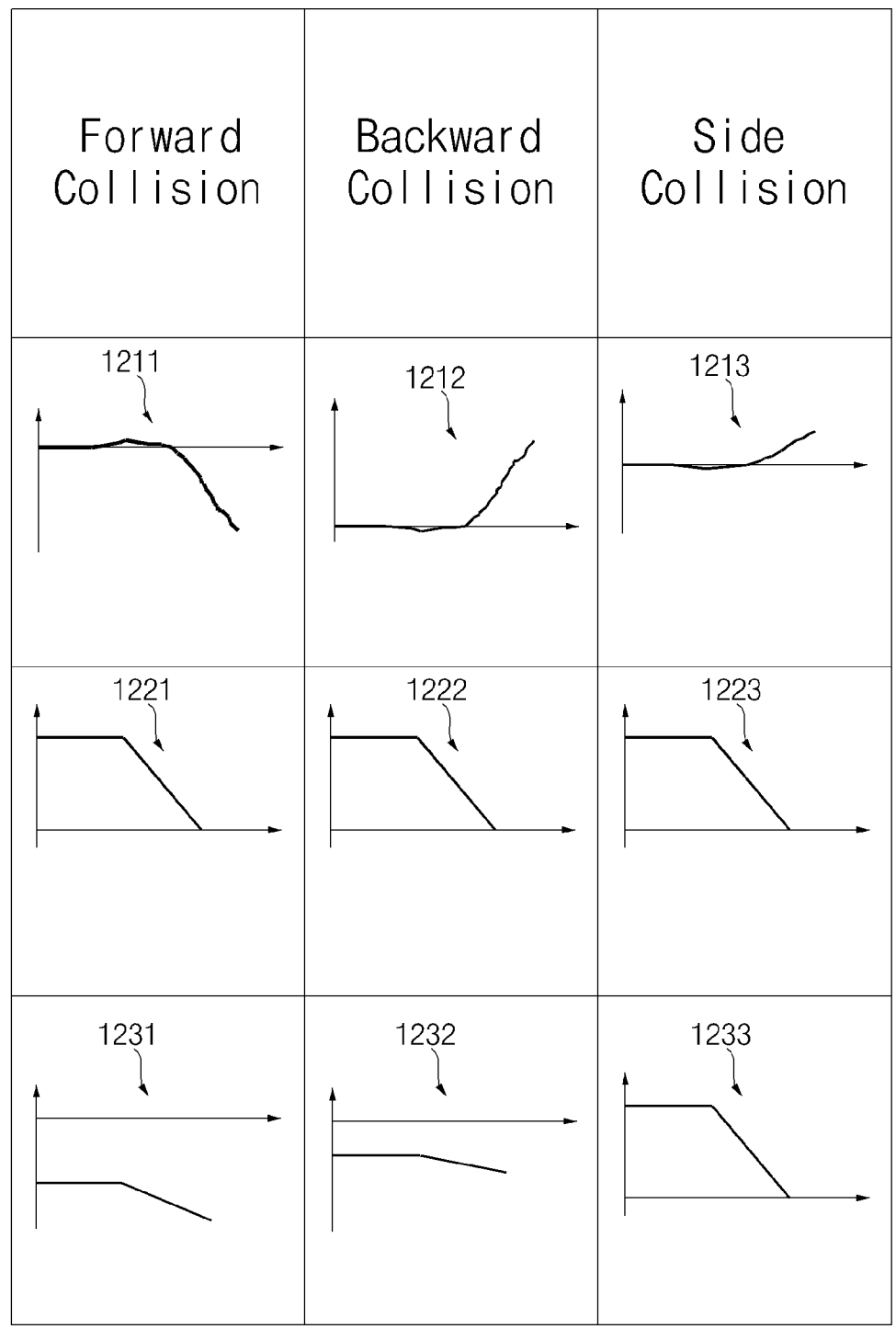
FIG. 12 is a diagram illustrating an example of a driving control apparatus that determines a travel direction of a vehicle after a collision of the vehicle.

FIG. 12 illustrates an example driving control apparatus that determines a travel direction of a vehicle after a collision of the vehicle.

Referring to FIG. 12, the processor 717 may determine a direction in which the vehicle 100 is to travel after collision between the vehicle 100 and a first object.

The processor 717 may determine a direction of the impact. The processor 717 may determine a direction of impact based on a value sensed by the IMU 1020.

For example, after the vehicle 100 collides with a first object, the IMU 1020 may sense a reduction in longitudinal acceleration. In this case, the processor 717 may determine that a forward collision occurs in which the vehicle 100 collides with the first object that is in front of the vehicle 100.

For example, after the vehicle 100 collides with a first object, the IMU 1020 may sense an increase in acceleration, which is indicated by reference numeral 1212. In this case, the processor 717 may determine that a backward collision occurs in which the vehicle 100 collides with the first object that is located behind the vehicle 100.

For example, after the vehicle 100 collides with a first object, the IMU 1020 may sense an increase/decrease in a lateral acceleration and an increase/decrease in the yaw rate. In this case, the processor 717 may determine that a side collision occurs in which the vehicle 100 collides with the first object that is located on the side of the vehicle 100.

The processor 717 may determine a direction of impact based on a value sensed by the collision sensor 1030. For example, the processor 717 may determine a direction of impact based on a sensed value indicating a direction of impulse.

The processor 717 may determine a direction of impact based on object information generated by the object detection device 300.

For example, the object detection device 300 may sense a reduction in a relative distance between the vehicle 100 and a first object, as indicated by reference numeral 1221. Alternatively, the object detection device 300 may sense a reduction in a relative speed between the vehicle 100 and a first object in front of the vehicle 100, as indicated by reference numeral 1231. At this point, the relative speed may be reduced with a negative value. In this case, the processor 717 may determine that a forward collision occurs in which the vehicle 100 collides with the first object in front of the vehicle 100.

For example, the object detection device 300 may sense a reduction in a relative distance between the vehicle 100 and a first object, which is behind the vehicle 100, as indicated by reference numeral 1222. Alternatively, the object detection device 300 may sense a reduction in a relative speed between the vehicle 100 and a first object, which is behind the vehicle 100, as indicated by reference numeral 1232. In this case, the processor 717 may determine that a backward collision occurs such that the vehicle 100 collides with the first object that is located behind the vehicle 100.

For example, the object detection device 300 may sense a reduction in a relative distance between the vehicle 100 and a first object, which is on the side of the vehicle 100, as indicated by reference numeral 1223. Alternatively, the object detection device 300 may sense a reduction in a relative speed between the vehicle 100 and a first object, which is on the side of the vehicle 100, as indicated by reference numeral 1233. In this case, the processor 717 may determine that a side collision occurs in which the vehicle 100 collides with the first object that is located on the side of the vehicle 100.

Based on object information generated by the object detection device 300, the processor 717 may determine information on a part of the vehicle 100 which is affected by the collision.

For example, the processor 717 may determine information about a collision part, based on an image acquired through the camera 310 or the lidar 330.

The processor 717 may determine a direction in which the vehicle 100 is to travel after collision, based on information on a driving direction of the vehicle 100 before the collision, information on a driving speed, information on a direction of impact in the collision, information on a part of the vehicle 100 which is affected by the collision, and information about impulse.

Figure 13:
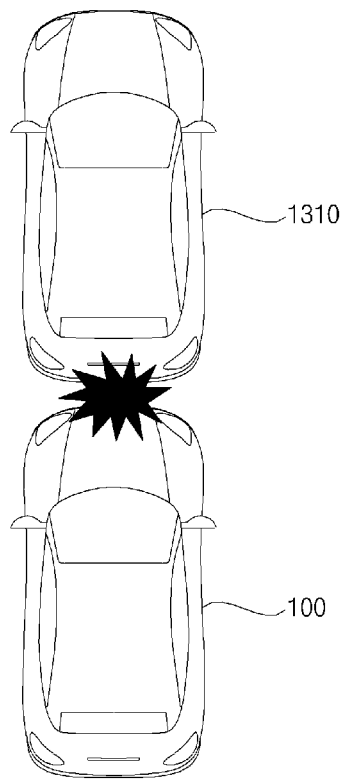
FIG. 13 is a diagram illustrating an example of a driving control apparatus in a state in which a front portion of a vehicle collides.
Figure 13:
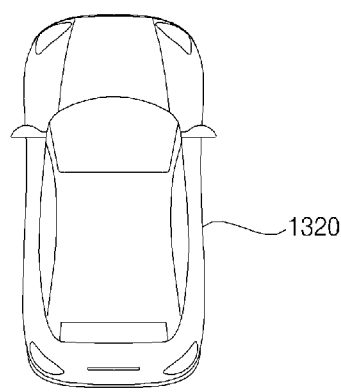

FIG. 13 illustrates an example operation of a driving control apparatus in a state in which a front portion of a vehicle collides.

Referring to FIG. 13, a first object may include a first vehicle 1310 which is in front of the vehicle 100.

The processor 717 may receive vehicle state information from the sensing unit 120.

The processor 717 may receive information on the first vehicle 1310 from the object detection device 300.

Based on the vehicle state information and the information on the first vehicle 1310, the processor 717 may determine that a forward collision occurs in which the vehicle 100 collides with the first vehicle 1310 that is in front of the vehicle 100.

The processor 717 may generate collision information based on the vehicle state information and the information on the first vehicle 1310.

Based on the collision information, the processor 717 may generate a control signal for at least one of steering, partial braking, and partial driving of the vehicle 100, and provide the generated control signal. The processor 717 may generate a control signal for at least one of steering, partial braking, and partial driving of the vehicle 100, and provide the generated control signal so as to control the vehicle 100 to stray off an expected travel path of a second vehicle 1320, which is travelling behind the vehicle 100, after the collision with the first vehicle 1310.

For example, when forward collision occurs, the processor 717 may determine that it is not possible to control braking or driving of the steering apparatus and the front wheels. In this case, the processor 717 may adjust a driving direction of the vehicle 100 through partial braking or partial driving of the rear wheels. Specifically, the processor 717 may apply different magnitude of a braking or driving force to the left rear wheel and the right rear wheel. By the partial braking or partial driving control, the vehicle 100 may move in the left direction or the right direction.

FIGS. 14 to 17 illustrate example operations of a driving control apparatus in a state in which a rear portion of a vehicle collides.

Figure 14:
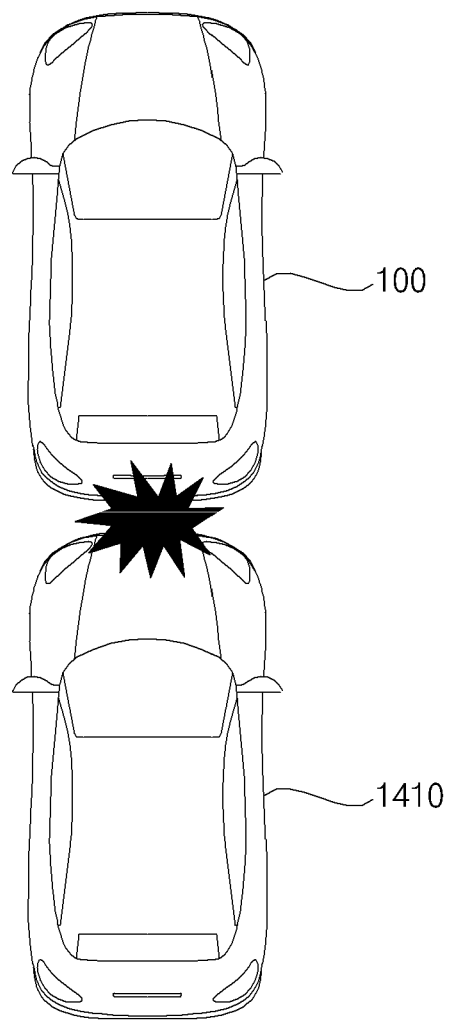
FIGS. 14 to 17 are diagrams illustrating examples of a driving control apparatus in a state in which a rear portion of a vehicle collides.

Referring to FIG. 14, a first object may include a vehicle 1410 approaching the vehicle 100 from behind.

The processor 717 may receive vehicle state information from the sensing unit 120.

The processor 717 may receive information on the vehicle 1410 from the object detection device 300.

Based on the vehicle state information and the information on the vehicle 1410, the processor 717 may determine that a backward collision occurs in which the vehicle 100 collides with the vehicle 1410 that is behind the vehicle 100.

The processor 717 may generate collision information based on the vehicle state information and the information on the vehicle 1410.

Based on the collision information, the processor 717 may generate a control signal for at least one of steering, partial braking, and partial driving of the vehicle 100, and provide the generated control signal.

Figure 15:
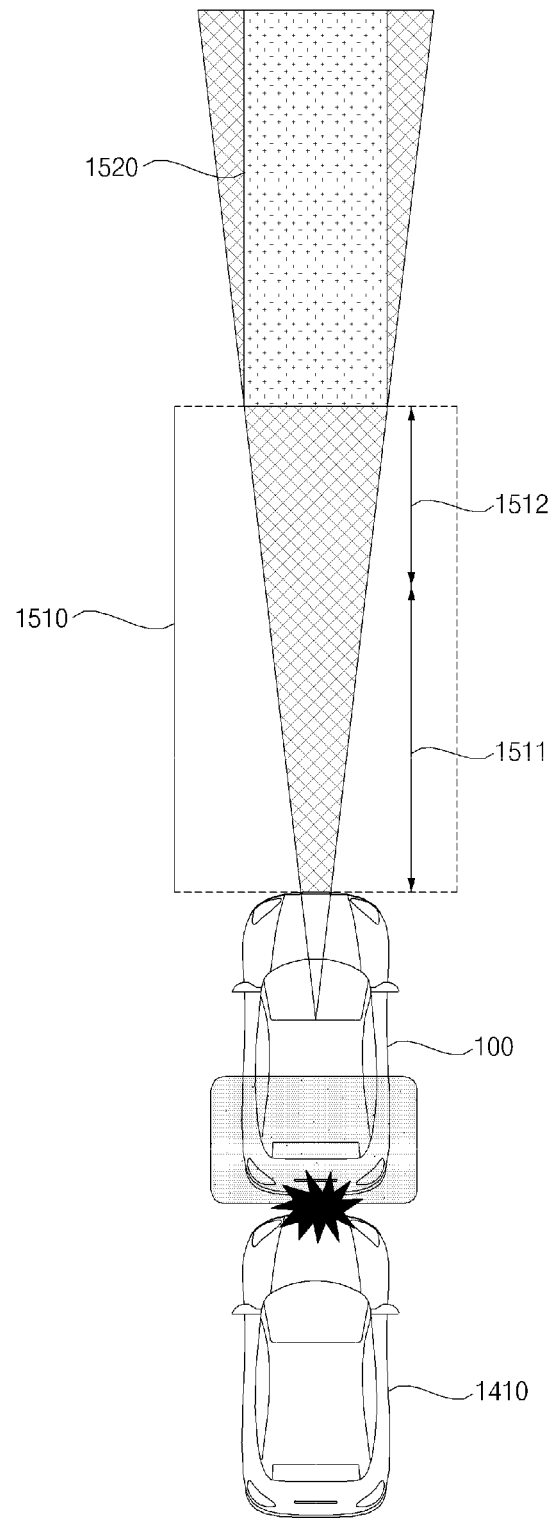

Referring to FIG. 15, the processor 717 may determine a situation in front of the vehicle 100, based on information on a plurality of objects.

Further based on the determined situation, the processor 717 may generate a control signal for at least one of steering, partial braking, and partial driving of the vehicle 100.

Based on the information on a plurality of objects, the processor 717 may determine that a sufficient space 1510 is secured within a preset range in front of the vehicle 100.

The sufficient space 1510 may be a space where any obstacle interfering with travelling of the vehicle 100 does not exist. The sufficient space 1510 may be a preset space. For example, the sufficient space 1510 may be a space that has a preset length based on a driving speed of the vehicle 100.

If it is determined that the sufficient space 1510 is secured in front of the vehicle 100, the processor 717 may provide a control signal to cause the vehicle 100 to travel in a released mode after the backward collision with the vehicle 1410.

Travelling in a released mode indicates travelling without a braking or driving force applied to wheels of the vehicle 100. The processor 717 may provide a control signal to a plurality of wheels to prevent a braking or driving operation.

Since the vehicle 100 is controlled to travel in a released mode after the backward collision, it is possible to distribute impact energy in the collision and therefore impulse to be applied to a passenger may be reduced.

When the vehicle 100 collides with the vehicle 1410, the processor 717 may determine a distance, by which the vehicle 100 is to travel in a released mode, based on a driving speed of the vehicle 100 and impulse in the collision between the vehicle 100 and the vehicle 1410.

Upon the collision, the processor 717 may calculate a distance 1511, by which the vehicle 100 is to travel in a released mode, to be proportional to a driving speed of the vehicle 100.

Upon the collision, the processor 717 may calculate a distance, by which the vehicle 100 is to travel in a released mode, to be proportional to the impulse detected in the collision.

The processor 717 may generate a control signal to control the vehicle 100 to be braked after travelling the distance 1511 in a released mode.

Based on information on a plurality of objects, the processor 717 may determine as to existence of a second object 1520 located outside the sufficient space 1510.

The object detection device 300 may detect the second object 1520. The object detection device 300 may generate information on the second object 1520. The processor 717 may receive information on the second object 1520 from the object detection device 300. Based on the information on the subject object 1520, the processor 717 may determine as to existence of the second object 1520 located outside the sufficient space 1510.

If it is determined that the second object 1520 exists outside the sufficient space 1510, the processor 717 may provide a control signal to cause the vehicle 100 to travel in a release state and then be braked without colliding the second object.

The processor 717 may determine the distance 1511, by which the vehicle 100 travels in a released mode, and a braking distance 1512 based on Time To Collision (TTC) with the second object 1520. Here, the TTC may be calculated based on a relative distance between the vehicle 100 and the second object 1520 and a relative speed between the vehicle 100 and the second object 1520.

If it is determined that the sufficient space 1510 is secured in front of the vehicle 100 in the case where a brake input is received through the driving manipulation device 500 after collision between the vehicle 100 and the vehicle 1410, the processor 717 may control an operation following the brake input not to be performed.

If the sufficient space 1510 is secured in front of the vehicle 100 even in the case where the brake input is received through the driving manipulation device 500, the processor 717 may generate a control signal to control the vehicle 100 to be braked after travelling in a released mode.

In this manner, even when a driver manipulates a brake pedal after backward collision, it is possible to distribute impact energy in the collision, thereby reducing impulse to be applied to a passenger.

Based on information on a plurality of objects, the processor 717 may determine whether an object of volume equal to or smaller than a preset volume exists in front of the vehicle 100.

Based on information on a plurality of objects, the processor 717 may determine whether an object of weight equal to or smaller than a preset weight exists in front of the vehicle 100.

The object detection device 300 may compare a detected object with data stored in a memory, classify the object, and confirm the classification. For example, the object detection device 300 may detect an object, and classify the detected object as small animal or loads in a different vehicle, and confirm the classification. Based on information on the classified and confirmed object, the processor 717 may determine that the object has volume or weight equal to or smaller than a preset volume.

If it is determined that a second object of volume equal to or smaller than a preset volume or of weight equal to or lighter than a preset weight exists in front of the vehicle 100, the processor 717 may provide a control signal to control the vehicle 100 to continue travelling in a released mode after the initial collision with another vehicle. In such scenarios, the vehicle may be allowed to continue travelling and collide with the second object that was detected to have the small volume.

In the case where the second object of volume equal to or smaller than a preset volume exists in front of the vehicle 100, if the vehicle 100 is controlled to travel in a released mode and collide with the second object, it may result in a less disastrous consequence, compared to the case where sudden and hard braking is performed and results in the failure of distributing the impulse.

Figure 16A:
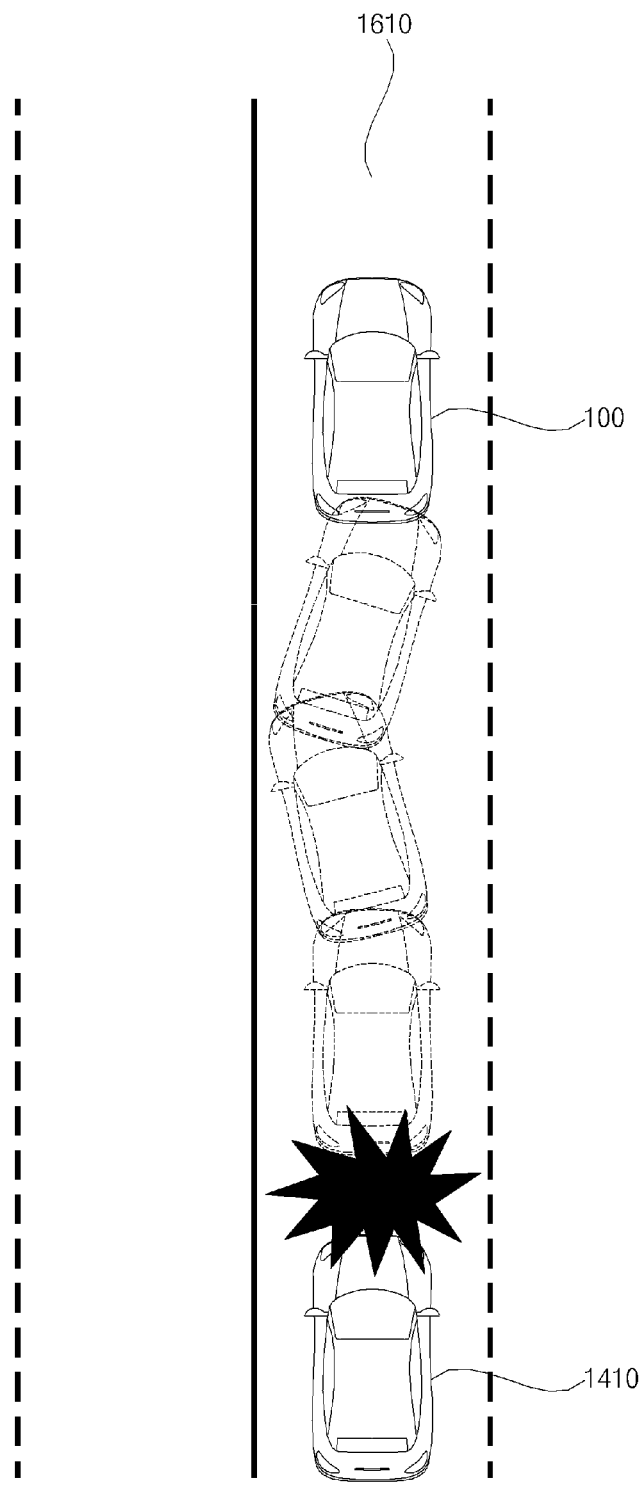

Referring to FIG. 16A, based on information on a plurality of objects, the processor 717 may determine a lane 1610 in which the vehicle 100 is travelling.

The object detection device 300 may detect a lane based on an image acquired by the camera 310. The object detection device 300 may generate information on the detected lane. Based on the information on the lane, the processor 717 may determine a lane 1610 in which the vehicle 100 is travelling.

In order to control the vehicle 100 to travel within the lane 1610 after collision with the vehicle 1410, the processor 717 may generate a control signal for at least one of steering, partial braking, and partial driving of the vehicle 100, and provide the generated control signal.

For example, when backward collision occurs, the processor 717 may determine that it is not possible to control braking and driving of the rear wheels. In this case, the processor 717 may provide a signal for steering or braking/driving of the front wheels. In this case, the processor 717 may adjust a driving direction of the vehicle 100 through a steering control action. Alternatively, the processor 717 may adjust a driving direction of the vehicle 100 through partial braking or partial driving of the front wheels.

By controlling the vehicle 100 not to depart from the driving lane 1610 even in the case of backward collision between the vehicle 100 and the vehicle 1410, it is possible to prevent a second accident with another vehicle travelling in a different lane.

Figure 16B:
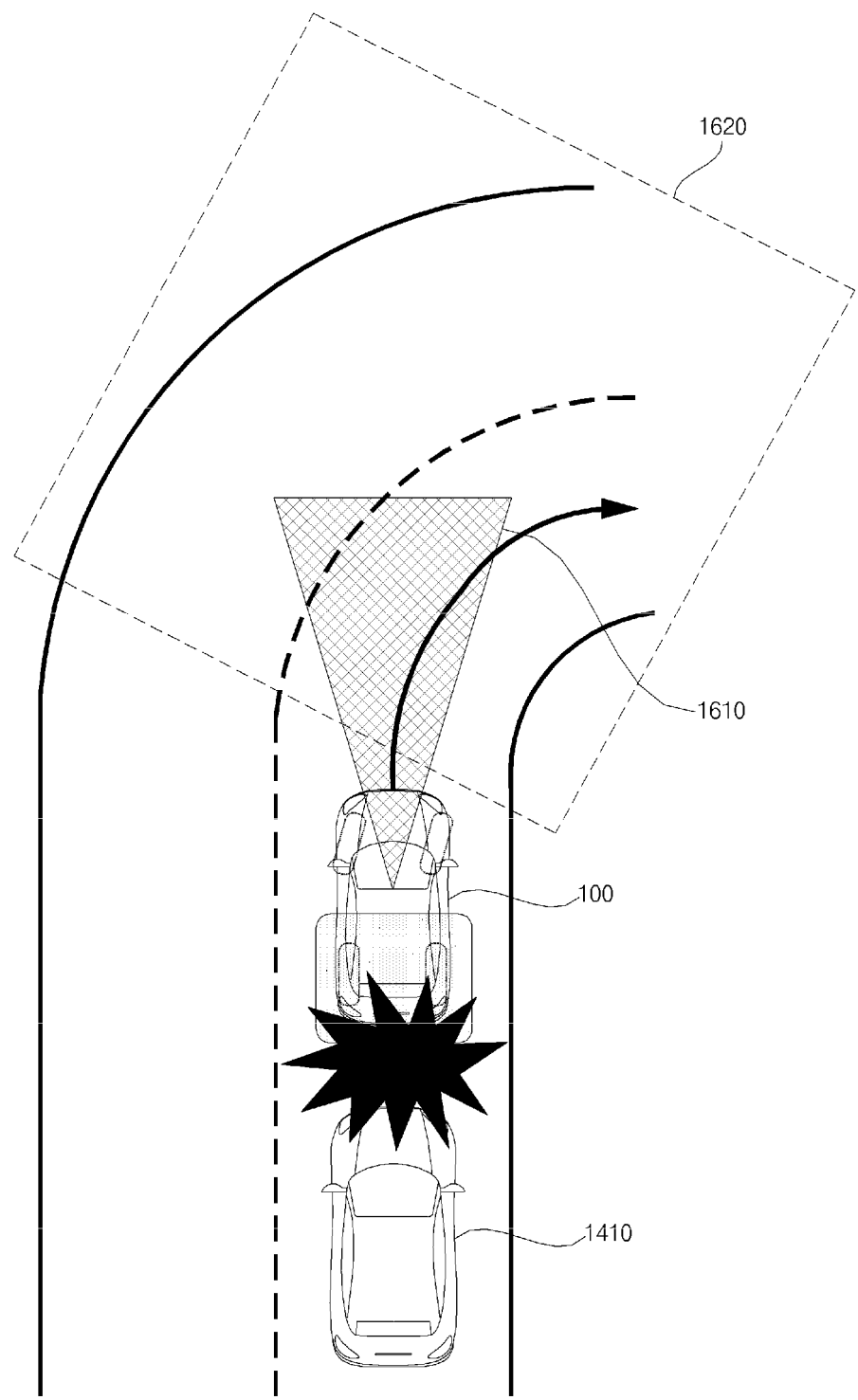

Referring to FIG. 16B, based on information on a plurality of object, the processor 717 may determine as to existence of a curve 1620 located in front of the vehicle 100.

The object detection device 300 may detect a lane based on an image acquired by the camera 310. The object detection device 300 may generate information on the detected lane.

The object detection device 300 may detect the curve 1620 based on an image acquired by the camera 310. The object detection device 300 may generate information on the detected curve 1620.

In order to control the vehicle 100 to travel within the lane 1610 in the curve 1620 after the collision with the vehicle 1410, the processor 717 may generate a control signal for at least one of steering, partial braking, and partial driving of the vehicle 100, and provide the generated control signal.

For example, when backward collision occurs, the processor 717 may determine that it is not possible to control braking and driving the rear wheels. In this case, the processor 717 may provide a signal for steering or braking/driving of the front wheels. In this case, the processor 717 may adjust a driving direction of the vehicle 100 through a steering control action. Alternatively, the processor 717 may adjust a driving direction of the vehicle 100 through partial braking or partial driving of the front wheels.

In some implementations, there may be a cliff at the curve. The processor 717 may acquire information on the cliff through the navigation system 770. In this case, the processor 717 may provide a control signal for at least one of steering, partial braking, and partial driving of the vehicle 100, and provide the generated control signal so as to prevent the vehicle 100 from traveling close to the cliff.

Figure 17:
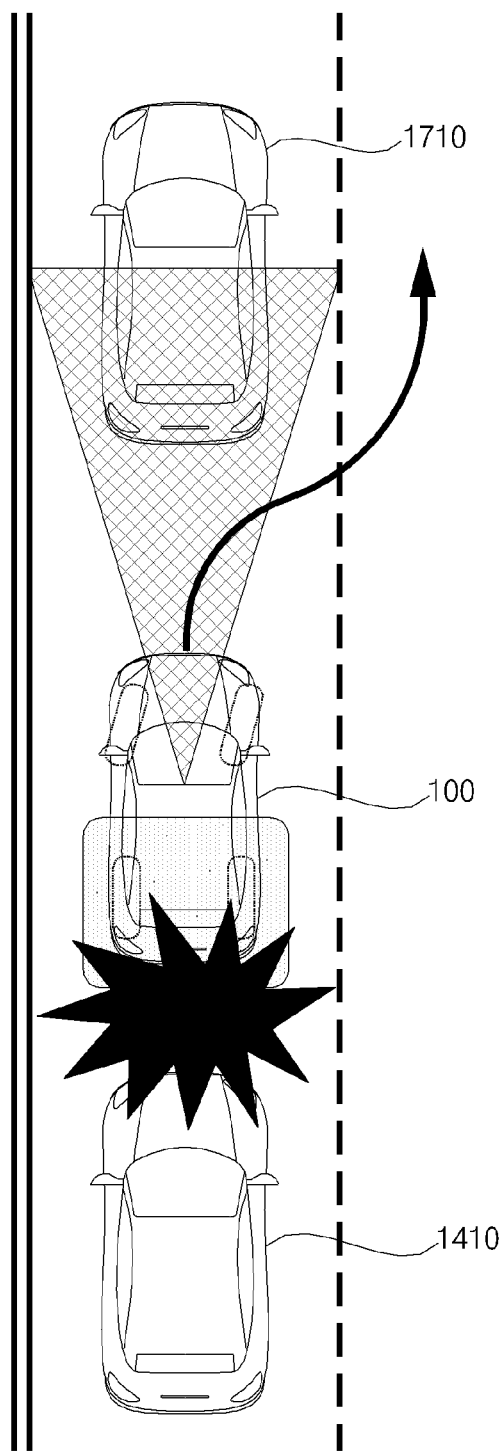

Referring to FIG. 17, based on information on a plurality of objects, the processor 717 may determine as to existence of a second object 1710 located within a preset range in front of the vehicle 100.

The object detection device 300 may detect a second object 1710. The object detection device 300 may generate information on the second object 1710. Based on the information on the second object 1710, the processor 717 may determine as to existence of the second object 1710 located within a preset range in front of the vehicle 100.

If it is determined that the second object exists within the preset range, the processor 717 may generate a control signal for at least one of steering, partial braking, and partial driving of the vehicle 100, and provide the generated control signal so as to prevent collision between the vehicle 100 and the second object 1710 after collision between the vehicle 100 and the vehicle 1410.

For example, when backward collision occurs, the processor 717 may determine that it is not possible to control braking and driving of the rear wheels. In this case, the processor 717 may provide a signal for steering or for braking/driving the front wheels. In this case, the processor 717 may adjust a driving direction of the vehicle 100 through a steering control action. Alternatively, the processor 717 may adjust a driving direction of the vehicle 100 through partial braking or partial driving of the front wheels.

Figure 18:
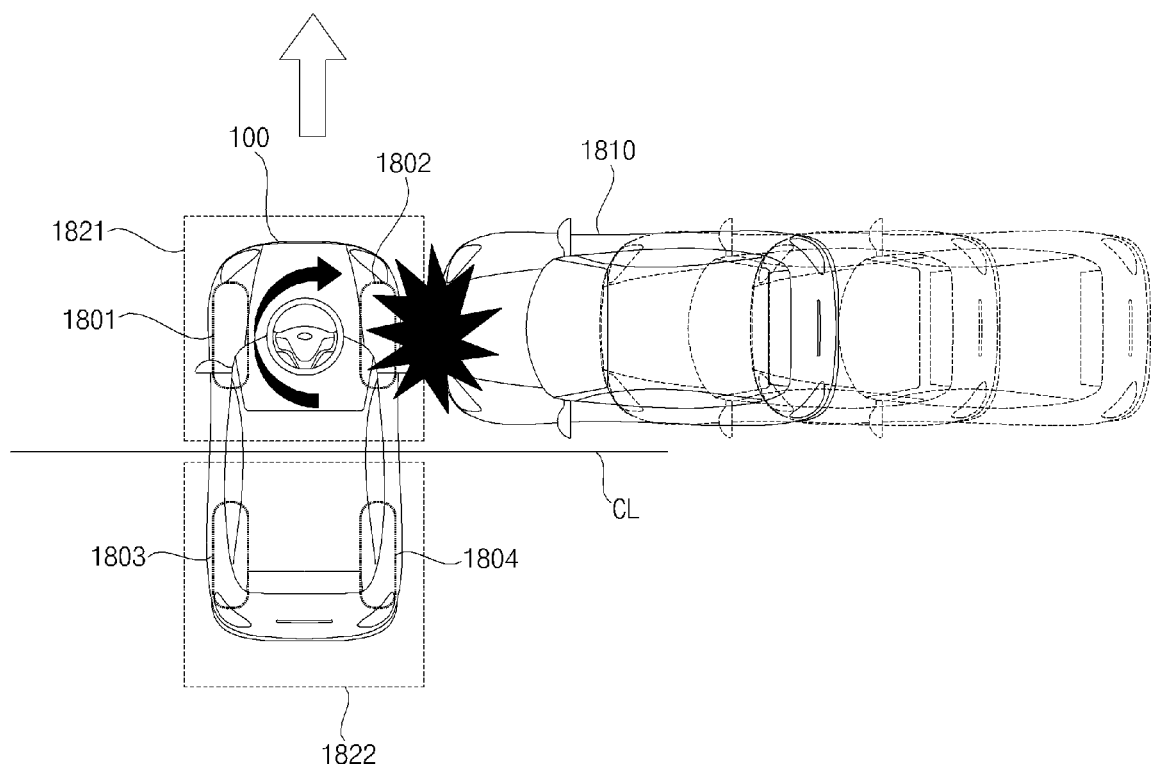
FIG. 18 is a diagram illustrating an example of a driving control apparatus in a state in which a side portion of a vehicle collides.

FIG. 18 illustrates an example operation of a driving control apparatus in a state in which a side portion of a vehicle collides.

Referring to FIG. 18, a first object may include a vehicle 1810 approaching the vehicle 100 from the side.

The processor 717 may receive vehicle state information from the sensing unit 120.

The processor 717 may receive information on the vehicle 1810 from the object detection device 300.

Based on the vehicle state information and the information on the vehicle 1810, the processor 717 may determine that a side collision occurs in which the vehicle 100 collides with the vehicle 1810 that is approaching the vehicle 100 from one side.

The processor 717 may generate collision information based on the vehicle state information and the information on the vehicle 1810.

Based on the collision information, the processor 717 may generate a control signal for at least one of steering, partial braking, and partial driving of the vehicle, and then provide the generated control signal.

In some implementations, the collision information may include information about an impulse in the collision between the vehicle 100 and the vehicle 1810, and information on a part of the vehicle 100 which is affected by the collision.

Based on the information about the impulse and the information on the part affected by the collision, the processor 717 may generate a control signal and provide the generated control signal to individually drive or brake a plurality of wheels provided in the vehicle 100.

For example, based on the information on the part affected by the collision, the processor 717 may generate a control signal and provide the generated control signal so as to apply a greater driving force to a wheel 1801 located on the opposite side where the collision occurs than a wheel 1802 located on the side where the collision occurs. In this case, the processor 717 may control the wheel 1802, which is located on the side where the collision occurs, to be released.

For example, based on the information on the part affected by the collision, the processor 717 may generate a control signal and provide the generated control signal so as to apply a smaller driving force to the wheel 1802 located on the side where the collision occurs than the wheel 1801 located on the opposite side where the collision occurs.

For example, based on the information on the part affected by the collision, the processor 717 may generate a control signal and provide the generated control signal so as to apply a smaller driving force to the wheel 1801 located on the opposite side where the collision occurs than the wheel 1802 located on the side where the collision occurs.

For example, based on the information on the part affected by the collision, the processor 717 may generate a control signal and provide the generated control signal so as to apply a greater braking force to the wheel 1802 located on the side where the collision occurs than the wheel 1801 located on the opposite side where the collision occurs Based on the information about the impulse, the processor 717 may determine magnitude of a driving force to be applied to each of the wheels 1801, 1802, 1803, and 1804 provided in the vehicle 100.

For example, the processor 717 may determine magnitude of a driving force, which is to be applied to the wheel 1801 on the opposite side where the collision occurs, to be proportional to the impulse.

For example, the processor 717 may determine magnitude of a braking force, which is to be applied to the wheel 1802 located on the side where the collision occurs, to be proportional to the impulse.

Based on the collision information, the processor 717 may generate a control signal for controlling suspensions of the vehicle 100 and provide the generated control signal.

A plurality of suspensions may be respectively connected to the plurality of wheels 1801, 1802, 1803, and 1804 included in the vehicle 100.

The processor 717 may control the plurality of suspensions individually.

For example, based on the information on the part affected by the collision, the processor 717 may generate a control signal and provide the generated control signal so as to lower a suspension corresponding to the wheel 1802, located on the side where the collision occurs, to be positioned lower than a suspension corresponding to the wheel 1801 located on the opposite side where the collision occurs.

For example, based on the information on the part affected by the collision, the processor 717 may generate a control signal and provide the generated control signal so as to raise a suspension corresponding to the wheel 1801, located on the opposite side where the collision occurs, to be positioned higher than a suspension corresponding to the wheel 1802 located on the side where the collision occurs.

In some implementations, based on the collision information, the processor 717 may generate a control signal for steering and provide the generated control signal.

For example, when a side collision occurs to the front part 1821 of the vehicle 100, the processor 717 may generate a control signal for steering and provide the generated control signal.

For example, when a side collision occurs to the rear part 1822 of the vehicle 100, the processor 717 may generate a control signal for steering and provide the generated control signal so as to steer the vehicle 100 in a direction opposite to a direction where the collision occurs.

The front part 1821 and the rear part 1822 may be divided by a center line CL of the overall-length direction of the vehicle 100.

In this manner, even in the case where a side collision occurs, the vehicle 100 may be prevented from rolling over or spinning, thereby enabled to avoid a more disastrous consequence.

Figure 19:
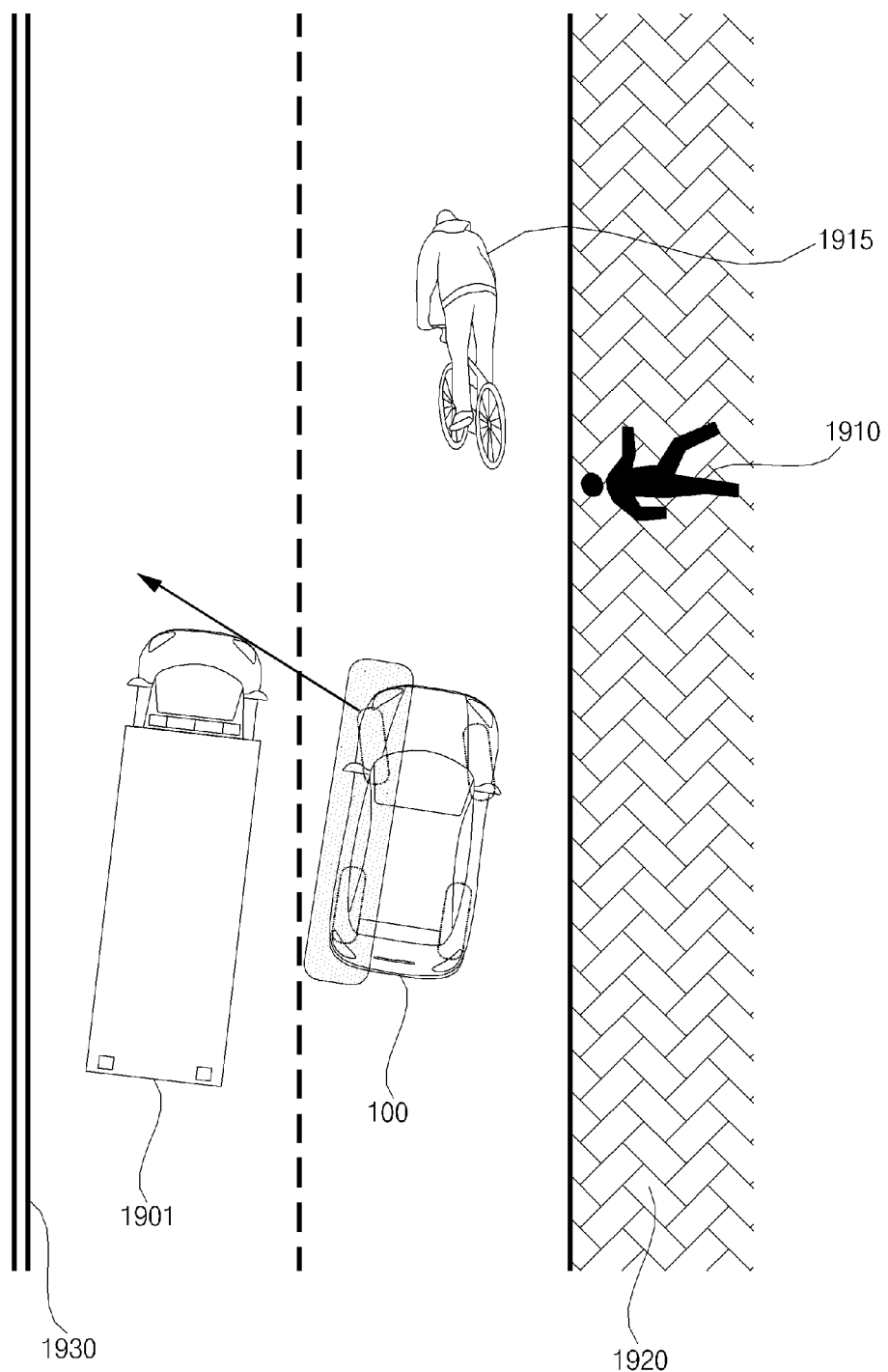
FIG. 19 is a diagram illustrating an example of a driving control apparatus protecting a pedestrian.

FIG. 19 illustrates an example operation of a driving control apparatus to protect a pedestrian.

Referring to FIG. 19, the object detection device 300 may detect an object to be dodged. The object to be dodged may include a pedestrian 1910, a two-wheeled vehicle 1915, a sidewalk 1920, and a centerline 1930.

The processor 717 may determine whether an object to be dodged is located in the vicinity of the vehicle 100, based on information on a plurality of objects.

The processor 717 may generate a control signal for at least one of steering, partial braking, and partial driving of the vehicle 100 and provide the generated control signal so as to prevent the vehicle 100 from travelling toward the object to be dodged after collision with a first object 1901.

For example, the processor 717 may generate a control signal for at least one of steering, partial braking, and partial driving of the vehicle 100 and provide the generated control signal so as to prevent the vehicle 100 from colliding with a pedestrian 1910 and a two-wheeled vehicle 1915 after collision with the first object 1901.

For example, the processor 717 may generate a control signal for at least one of steering, partial braking, and partial driving of the vehicle 100, and provide the generated control signal so as to prevent the vehicle 100 from moving onto a sidewalk 1920 or crossing a centerline 1830.

The examples described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller.

The examples described above can be modified. In particular, various variations and modifications can be made in the component parts and/or arrangements of the subject combination arrangement. In addition to variations and modifications in the component parts and/or arrangements, any suitable alternatives in the component parts and/or arrangements are possible.

What is claimed is:

1. A driving control apparatus for a vehicle, the apparatus comprising:
    an object detection device configured to detect a plurality of objects within a predetermined distance from the vehicle and generate information on the plurality of objects;
    a sensing unit configured to detect a state of the vehicle and generate vehicle state information; and
    a processor configured to:
        based on the vehicle state information and the information on the plurality of objects, generate information on collision with a first object out of the plurality of objects, the first object comprising a nearby vehicle approaching the vehicle from behind,
        based on the information on the collision, generate a control signal for at least one of steering, partial braking, and partial driving of the vehicle and provide the generated control signal so as to control operation of the vehicle after the collision through at least one of a steering control action, a partial braking control action, and a partial driving control action,
        generate the information on collision based on determining that the vehicle collides with the nearby vehicle,
        based on the information on the plurality of objects, determine whether a second object having a volume less than or equal to a preset volume exists in front of the vehicle, and
        based on determining that the second object exists in front of the vehicle, provide the control signal to control the vehicle to travel in a released state after the collision with the nearby vehicle to allow the vehicle to collide with the second object.

2. The driving control apparatus according to claim 1, wherein the object detection device is configured to generate information on the first object, and
    wherein the processor is configured to:
        based on the vehicle state information and the information on the first object, determine an impulse in the collision between the vehicle and the first object; and
        based on information about the impulse, generate the control signal.

3. The driving control apparatus according to claim 1, wherein the object detection device is configured to generate information on the first object, and
    wherein the processor is configured to:
        based on the vehicle state information and the information on the first object, determine a direction in which the vehicle is to travel after the collision with the first object; and
        generate the control signal based on information on the determined direction.

4. The driving control apparatus according to claim 1, wherein the processor is configured to:
    based on the vehicle state information and information on the first object, determine whether at least one of a steering apparatus, a power transmission apparatus, and a brake apparatus is controllable after the collision between the vehicle and the first object; and
    provide the control signal to a controllable device among the steering apparatus, the power transmission apparatus, and the brake apparatus, and
    wherein the power transmission apparatus transfers power, provided from a power source, to a plurality of wheels.

5. The driving control apparatus according to claim 1, wherein the first object comprises a first nearby vehicle which is in front of the vehicle, and
    wherein the processor is configured to:
        when it is determined that the vehicle collides with the first nearby vehicle, generate the information on the collision; and
        generate a control signal for at least one of steering, partial braking, and partial driving of the vehicle, and provide the generated control signal so as to control the vehicle to stay off an expected travel path of a second nearby vehicle, which is travelling behind the vehicle, after the collision with the first nearby vehicle.

6. The driving control apparatus according to claim 1, wherein the processor is configured to:
    based on information on the plurality of objects, determine whether a sufficient space exists within a preset range in front of the vehicle; and
    based on determining that the sufficient space exists in front of the vehicle, provide the control signal to control the vehicle to travel in the released state after the collision with the nearby vehicle.

7. The driving control apparatus according to claim 6, wherein the processor is configured to:
   upon collision between the vehicle and the nearby vehicle, determine a distance by which the vehicle is to travel in the released state, based on a driving speed of the vehicle and an impulse in the collision between the vehicle and the nearby vehicle; and
   provide the control signal to control the vehicle to be braked after travelling the determined distance in the released state.

8. The driving control apparatus according to claim 6, wherein the processor is configured to:
   based on the information on the plurality of objects, determine whether a third object exists outside the sufficient space; and
   based on determining that the third object exists outside the sufficient space, provide the control signal so as to control the vehicle to be braked, without colliding with the third object, after travelling in the released state.

9. The driving control apparatus according to claim 6, wherein the processor is configured to, in response to a brake input received through a driving manipulation device after the collision between the vehicle and the nearby vehicle, control an operation corresponding to the brake input not to be performed based on determining that a sufficient space is secured in front of the vehicle.

10. The driving control apparatus according to claim 1, wherein the processor is configured to:
    based on the information on the plurality of objects, determine a lane in which the vehicle is located; and
    provide the control signal so as to control the vehicle to travel in the determined lane after the collision with the nearby vehicle.

11. The driving control apparatus according to claim 10, wherein the processor is configured to:
    based on the information on the plurality of objects, determine that a curve is located in front of the vehicle; and
    provide the control signal to control the vehicle to travel in the determined lane and in the curve after the collision with the nearby vehicle.

12. The driving control apparatus according to claim 1, wherein the processor is configured to:
    based on the information on the plurality of objects, determine whether a third object exists in a preset range in front of the vehicle; and
    based on determining that the third object exists in the preset range, generate a control signal for at least one of steering, partial braking, and partial driving of the vehicle, and provide the generated control signal so as to control the vehicle to avoid colliding with the third object after the collision with the nearby vehicle.

13. The driving control apparatus according to claim 1, wherein the first object comprises a nearby vehicle that is approaching the vehicle from one side, and
    wherein, when it is determined that the vehicle collides with the nearby vehicle, the processor is configured to generate information on the collision.

14. The driving control apparatus according to claim 13, wherein the information on the collision comprises information about an impulse in the collision between the vehicle and the nearby vehicle and information on a part of the vehicle which is affected by the collision, and
    wherein the processor is configured to, based on the information about the impulse and the information on the part affected by the collision, provide the control signal to individually drive or brake a plurality of wheels provided in the vehicle.

15. The driving control apparatus according to claim 14, wherein the processor is configured to, based on the information on the part affected by the collision, provide the control signal so as to apply a greater driving force to a wheel located on the opposite side where the collision occurs than a wheel located on the side where the collision occurs, or to apply a smaller driving force to the wheel located on the side where the collision occurs than the wheel located on the opposite side where the collision occurs.

16. The driving control apparatus according to claim 14, wherein the processor is configured to determine, based on the information about the impulse, an amount of a driving force to be applied to each of the plurality of wheels provided in the vehicle.

17. A vehicle comprising a driving control apparatus that includes:
    an object detection device configured to detect a plurality of objects within a predetermined distance from the vehicle and generate information on the plurality of objects;
    a sensing unit configured to detect a state of the vehicle and generate vehicle state information; and
    a processor configured to:
       based on the vehicle state information and the information on the plurality of objects, generate information on collision with a first object out of the plurality of objects, the first object comprising a nearby vehicle approaching the vehicle from behind,
       based on the information on the collision, generate a control signal for at least one of steering, partial braking, and partial driving of the vehicle and provide the generated control signal so as to control operation of the vehicle after the collision through at least one of a steering control action, a partial braking control action, and a partial driving control action,
       generate the information on collision based on determining that the vehicle collides with the nearby vehicle,
       based on the information on the plurality of objects, determine whether a second object having a volume less than or equal to a preset volume exists in front of the vehicle, and
       based on determining that the second object exists in front of the vehicle, provide the control signal to control the vehicle to travel in a released state after the collision with the nearby vehicle to allow the vehicle to collide with the second object.

18. The driving control apparatus according to claim 1, wherein the processor is configured to, in the released state, control the vehicle to travel without operating a braking apparatus or applying driving force to the vehicle after the collision with the nearby vehicle.

19. The vehicle according to claim 17, wherein the processor is configured to, in the released state, control the vehicle to travel without operating a braking apparatus or applying driving force to the vehicle after the collision with the nearby vehicle.

\* \* \* \* \*